United States Patent
Gao et al.

(10) Patent No.: US 12,135,939 B2
(45) Date of Patent: Nov. 5, 2024

(54) SYSTEMS AND METHODS FOR DEVIATION DETECTION, INFORMATION EXTRACTION AND OBLIGATION DEVIATION DETECTION

(71) Applicant: Thomson Reuters Enterprise Centre GmbH, Zug (CH)

(72) Inventors: Sally Gao, Boston, MA (US); Hella-Franziska Hoffmann, London (GB); Nina Hristozova, Zurich (CH); Elizabeth Roman, Somerville, MA (US); Nicolai Pogrebnyakov, Ontario (CA); Yue Feng, Ontario (CA); Masoud Makrehchi, Ontario (CA); Tate Sterling Avery, Ontario (CA); Shohreh Shaghaghian, Ontario (CA); Borna Jafarpour, Ontario (CA)

(73) Assignee: THOMSON REUTERS ENTERPRISE CENTRE GMBH, Zug (CH)

( * ) Notice: Subject to any disclaimer, the term of this patent is extended or adjusted under 35 U.S.C. 154(b) by 290 days.

(21) Appl. No.: 17/156,568

(22) Filed: Jan. 23, 2021

(65) Prior Publication Data

US 2021/0319180 A1    Oct. 14, 2021

Related U.S. Application Data

(60) Provisional application No. 62/975,514, filed on Feb. 12, 2020, provisional application No. 62/965,523, (Continued)

(51) Int. Cl.
*G06F 40/289* (2020.01)
*G06F 3/0481* (2022.01)
(Continued)

(52) U.S. Cl.
CPC .......... *G06F 40/279* (2020.01); *G06F 3/0481* (2013.01); *G06F 40/109* (2020.01);
(Continued)

(58) Field of Classification Search
None
See application file for complete search history.

(56) References Cited

U.S. PATENT DOCUMENTS 6,298,357 B1   10/2001   Wexler
7,672,022 B1    3/2010   Fan
(Continued)

OTHER PUBLICATIONS

Cai et al., "*VIPS: a Vision-based Page Segmentation Algorithm,*" Nov. 1, 2003, pp. 1-29 (Year 2003).
(Continued)

*Primary Examiner* — Haoshian Shih
(74) *Attorney, Agent, or Firm* — Alston & Bird LLP

(57) ABSTRACT

The present disclosure is directed towards systems and methods for detecting deviations between documents and portions thereof, extracting information from text and detecting deviations between obligations. Deviations between sentences containing obligations are detected by classifying the sentences, identifying components of the obligations and identifying differences between the obligation components.

13 Claims, 18 Drawing Sheets

Related U.S. Application Data filed on Jan. 24, 2020, provisional application No. 62/965,516, filed on Jan. 24, 2020, provisional application No. 62/965,520, filed on Jan. 24, 2020.

(51) Int. Cl.
*G06F 40/109* (2020.01)
*G06F 40/137* (2020.01)
*G06F 40/166* (2020.01)
*G06F 40/232* (2020.01)
*G06F 40/242* (2020.01)
*G06F 40/258* (2020.01)
*G06F 40/279* (2020.01)
*G06F 40/284* (2020.01)
*G06V 30/416* (2022.01)

(52) U.S. Cl.
CPC .......... *G06F 40/137* (2020.01); *G06F 40/166* (2020.01); *G06F 40/232* (2020.01); *G06F 40/242* (2020.01); *G06F 40/258* (2020.01); *G06F 40/284* (2020.01); *G06F 40/289* (2020.01); *G06V 30/416* (2022.01)

(56) References Cited

U.S. PATENT DOCUMENTS

| | | | |
|---|---|---|---|
| 7,797,622 B2 | 9/2010 | Dejean | |
| 7,937,653 B2 | 5/2011 | Dejean | |
| 8,631,097 B1 | 1/2014 | Seo | |
| 8,898,296 B2 | 11/2014 | Zeng | |
| 8,914,720 B2 | 12/2014 | Harrington | |
| 9,218,326 B2 | 12/2015 | Dejean | |
| 9,336,202 B2 | 5/2016 | Khan | |
| 9,483,463 B2 | 11/2016 | Galle et al. | |
| 9,514,499 B1* | 12/2016 | Kogut-O'Connell | G06Q 10/10 |
| 10,019,488 B2 | 7/2018 | Levy | |
| 10,049,270 B1 | 8/2018 | Agarwalla et al. | |
| 10,318,568 B2 | 6/2019 | Yasue | |
| 10,460,162 B2 | 10/2019 | Gelosi | |
| 10,614,113 B2 | 4/2020 | Peled | |
| 10,726,198 B2 | 7/2020 | Gelosi | |
| 10,878,195 B2 | 12/2020 | Duta | |
| 10,885,282 B2 | 1/2021 | Ilic | |
| 11,023,675 B1 | 6/2021 | Neervannan | |
| 11,170,759 B2 | 11/2021 | Sim | |
| 11,205,043 B1 | 12/2021 | Neervannan | |
| 11,205,044 B1 | 12/2021 | Neervannan | |
| 11,256,856 B2 | 2/2022 | Gelosi | |
| 11,475,209 B2 | 10/2022 | Gelosi | |
| 11,763,079 B2 | 9/2023 | Pito | |
| 2004/0049462 A1* | 3/2004 | Wang | G06Q 50/184 705/50 |
| 2004/0162827 A1* | 8/2004 | Nakano | G06F 16/334 |
| 2006/0156226 A1 | 7/2006 | Dejean | |
| 2008/0114757 A1 | 5/2008 | Dejean | |
| 2011/0029952 A1 | 2/2011 | Harrington | |
| 2011/0055206 A1* | 3/2011 | Martin | G06F 40/289 707/723 |
| 2011/0075932 A1 | 3/2011 | Komaki | |
| 2011/0145701 A1 | 6/2011 | Dejean | |
| 2011/0197121 A1* | 8/2011 | Kletter | G06F 40/194 715/255 |
| 2011/0216975 A1 | 9/2011 | Rother | |
| 2012/0278321 A1 | 11/2012 | Traub et al. | |
| 2012/0297025 A1 | 11/2012 | Zeng | |
| 2013/0174029 A1 | 7/2013 | O'Sullivan et al. | |
| 2013/0191366 A1 | 7/2013 | Jovanovic | |
| 2013/0311169 A1 | 11/2013 | Khan | |
| 2014/0074455 A1 | 3/2014 | Galle et al. | |
| 2014/0337719 A1 | 11/2014 | Xu et al. | |
| 2015/0067476 A1 | 3/2015 | Song | |
| 2015/0100308 A1 | 4/2015 | Bedrax-Weiss et al. | |
| 2015/0161102 A1* | 6/2015 | Gidney | G06F 40/30 704/9 |
| 2015/0169676 A1 | 6/2015 | Bohra | |
| 2016/0048520 A1 | 2/2016 | Levy | |
| 2017/0011313 A1* | 1/2017 | Pochert | G06F 3/0481 |
| 2017/0017641 A1* | 1/2017 | Gidney | G06F 40/30 |
| 2017/0052934 A1* | 2/2017 | Hatsutori | G06F 40/137 |
| 2017/0103466 A1* | 4/2017 | Syed | G06Q 50/188 |
| 2017/0329846 A1 | 11/2017 | Dole | |
| 2017/0351688 A1 | 12/2017 | Yasue | |
| 2018/0039907 A1 | 2/2018 | Kraley | |
| 2018/0096060 A1 | 4/2018 | Peled | |
| 2018/0260378 A1* | 9/2018 | Theodore | G06F 40/169 |
| 2018/0268506 A1* | 9/2018 | Wodetzki | G06N 5/046 |
| 2018/0300315 A1 | 10/2018 | Leal | |
| 2019/0034718 A1 | 1/2019 | Lee | |
| 2019/0114479 A1 | 4/2019 | Gelosi | |
| 2019/0155944 A1 | 5/2019 | Mahata et al. | |
| 2019/0220503 A1 | 7/2019 | Gelosi | |
| 2019/0272421 A1* | 9/2019 | Sugaya | G06V 30/416 |
| 2019/0278853 A1 | 9/2019 | Chen | |
| 2019/0340240 A1 | 11/2019 | Duta | |
| 2019/0347284 A1* | 11/2019 | Roman | G06F 40/131 |
| 2020/0026916 A1* | 1/2020 | Wood | G06F 40/205 |
| 2020/0043113 A1* | 2/2020 | DePalma | G06F 40/289 |
| 2020/0097759 A1 | 3/2020 | Nadim | |
| 2020/0104957 A1* | 4/2020 | Guo | G06F 40/30 |
| 2020/0110800 A1* | 4/2020 | Astigarraga | G06F 40/289 |
| 2020/0184013 A1 | 6/2020 | Ilic | |
| 2020/0219481 A1 | 7/2020 | Sim | |
| 2020/0226510 A1* | 7/2020 | Gupta | G06Q 50/18 |
| 2020/0272788 A1 | 8/2020 | Sanderson | |
| 2020/0311412 A1 | 10/2020 | Prebble | |
| 2020/0327151 A1* | 10/2020 | Coquard | G06F 16/3347 |
| 2020/0364291 A1 | 11/2020 | Bentabet | |
| 2021/0034816 A1 | 2/2021 | Lall et al. | |
| 2021/0065042 A1* | 3/2021 | Gopalan | G06N 3/045 |
| 2021/0117667 A1 | 4/2021 | Mehra | |
| 2021/0150128 A1 | 5/2021 | Gelosi | |
| 2021/0201013 A1* | 7/2021 | Makhija | G06F 16/258 |
| 2022/0277140 A1* | 9/2022 | Rhim | G06V 30/30 |

OTHER PUBLICATIONS

Pomikalek, Jan, "Removing Boilerplate and Duplicate Content from Web Corpora." 108 pages, (2011), https://is.muni.cz/th/45523/fi_d/phdthesis.pdf.

* cited by examiner

Fig. 3

| ref | direction | from | to | len_to_sent | len_from_sent | ... | nr_common_words | tfidf_feature_1 | ... | tfidf_feature_n | svd_feature_1 | ... | svd_feature_n | cosine | euclidean | manhattan | jaccard | jaccard_overlap | dice | Overlap_coeff | cosine | cityblock | ... | wmd | Gold_label |
|---|---|---|---|---|---|---|---|---|---|---|---|---|---|---|---|---|---|---|---|---|---|---|---|---|---|
| | | basic | | | | | | tfidf | | | svd | | | tfidf dist | | | bow dist | | | | w2v dist | | | | |
| CC | s2doc | $1 | $1 | 207 | 208 | ... | 24 | 0.32 | ... | 0.00 | 0.18 | ... | -0.1 | 0.28 | 0.75 | 4.07 | 0.58 | 0.66 | 0.74 | 0.74 | 0.05 | 0.55 | ... | 0.34 | 1 |
| CC | s2doc | $1 | $4 | 207 | 110 | ... | 5 | 0.12 | ... | 0.05 | 0.33 | ... | -0.2 | 0.94 | 1.37 | 12.1 | 0.05 | 0.14 | 0.10 | 0.23 | 0.17 | 0.59 | ... | 2.44 | 0 |
| ... | ... | ... | ... | ... | ... | ... | ... | ... | ... | ... | ... | ... | ... | ... | ... | ... | ... | ... | ... | ... | ... | ... | ... | ... | ... |

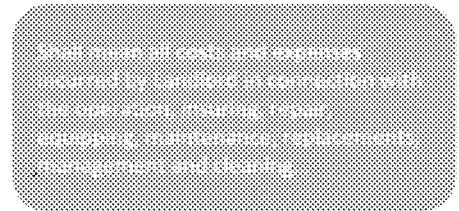

1.2, (Basic Data), of this Lease .
Effective January 1, 2010, Tenant shall pay monthly, at the time when Rent payments are due hereunder, an amount equal to one-twelfth (1/12th) of the total annual Operating Costs (as estimated by Landlord ) due from Tenant to Landlord pursuant to Article 4.3 of this Lease . Promptly after the end of each calendar year thereafter, Landlord shall make a reasonable determination of Tenant 's share of such Operating Costs ; and if the aforesaid payments theretofore made for such period by Tenant exceed Tenant 's share, such overpayment shall be credited against the payments thereafter to be made by Tenant pursuant to this Paragraph; and if Tenant ' s share is greater than such payments theretofore made on account for such period, Tenant shall within thirty (30) days of written notice from the Landlord make a suitable payment to Landlord .

Fig. 18

Pattern 1: ("Defined Term") or (as "Defined Term")

```
pattern1 = re.compile(r'\([a-z\s]*["]\s*([A-Z]|[0-9])[a-z\s\']*\s*["]\)')
```

Pattern 2: "Defined Term"

```
pattern2 = re.compile(r'(?:\()("|")\s*([A-Z]|[0-9])[a-z\s\']*\s*(":")(?:\))')
```

Pattern 3: Defined Term:

```
pattern3 = re.compile(r'([A-Z-]([]a-z\'~]+\s*)+(for\s|the\s|on\s|of\s|and\s|to\s|this\s)\(\s\)*
                       r'([A-Z][a-z']+\s*)+(;|\s:)')
```

Pattern 4: DEFINED TERM:

```
pattern4 = re.compile(r'[A-Z][A-Z\s\'~]+(;|\s:)')
```

SYSTEMS AND METHODS FOR DEVIATION DETECTION, INFORMATION EXTRACTION AND OBLIGATION DEVIATION DETECTION

CROSS-REFERENCE TO RELATED APPLICATIONS

This application claims the benefit of and priority to U.S. Provisional Application Nos. 62/965,516, filed Jan. 24, 2020; 62/965,520, filed Jan. 24, 2020; 62/965,523, filed Jan. 24, 2020; and 62/975,514, filed Feb. 12, 2020, which are hereby incorporated by reference in their entireties.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

BACKGROUND

The present innovations generally address tools for detecting deviations among documents and portions thereof, extracting information from documents and portions thereof, and detecting deviations between obligations in documents and portions thereof.

One practical application of these concepts is in the review of legal contracts and the differences between the clauses that they contain. For example, during negotiation lawyers often may need to look at redlined changes from a counterparty and determine whether those are acceptable or not. During an acquisition of a company, for example, due diligence often needs to be performed on a large set of contracts to determine risks and deviations from standard contract templates of the acquiring company. As another example, users may desire to extract key terms and clauses from a certain document (e.g. lease agreement) and look for legal issues that could provide risks for their clients. A common subtask in the review process often involves comparing a document to an agreed upon standard document of the same type and flagging significant deviations, which is a time-consuming, often fully manual process.

While there exist basic document comparison tools, most employ techniques that only consider simple syntactic differences. As a result, these tools only work for comparing very similar documents that are drafted from the same document template. In particular, most document comparison tools . . . :
  (a) do not deal well with major changes in formatting or reordering of paragraphs and sentences [showing them as addition plus deletion instead],
  (b) overwhelm the user with minor syntactic differences that do not constitute any differences in meaning (e.g. "three months" vs "3 months"), and
  (c) are not able to measure the type or degree of difference, making it difficult to categorize or prioritize changes.

Accordingly, the present inventions address the need for improvements in computer functionality to detect deviations among documents and portions thereof, extract information from documents and portions thereof, and detect deviations between obligations in documents and portions thereof.

In order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BRIEF SUMMARY

The present invention provides a system and method for structure and/or header extraction.

In one aspect, a method for detecting deviations comprises receiving a standard document and a review document, splitting apart sentences in each of the standard document and review document, matching a sentence from the review document to a sentence from the standard document, and detecting deviations in a review sentence from a standard sentence matched to the review sentence.

In one example, the method further comprises selecting, based on content of at least one of review sentence and the matched standard sentence, a deviation detection tool from among a group of more than one deviation detection tools to perform the deviation detection for those sentences.

In another example, the sentence preprocessed before they are matched by converting all characters to lower case.

In another example, the sentence preprocessed before they are matched by removing any numbered or lettered list items at the beginning of the sentence.

In another example, the sentence preprocessed before they are matched by removing any numbers as tokens.

In another example, the sentences are matched based at least on a comparison of at least one of the length of the sentences, character length of the sentences without spaces, average length of the words in the sentences, number of words in the sentences, and number of common words in the sentences.

In another example, the method further comprises outputting an indication to a user interface if a review sentence is not matched to a sentence in the standard document or is a sentence in the standard document is not matched to a review sentence.

In another example, the method further comprises selecting, based on a closeness of the match between a review sentence and its matched standard sentence, a deviation detection tool from among a group of more than one deviation detection tools to perform the deviation detection for those sentences.

In another example, deviations between a review sentence and its matching sentence from the standard document are not detected if a closeness of the match is less than a predetermined closeness threshold.

In another example, the method further comprises matching more than one sentence from the review document to one sentence from the standard document wherein deviations are detected between the more than one sentence from the review document as a whole and the one matching sentence from the standard document.

In another example, the method further comprises matching one sentence from the review document to more than one sentence from the standard document wherein deviations are detected between the one sentence from the review document and the matching more than one sentence from the standard document as a whole.

In another example, the method further comprises outputting indications of a detected deviation to a user interface only if the detected deviation does not involve only the addition or deletion of a word contained on a predetermined list of words to be ignored.

In another aspect, a method for extracting information, comprises receiving an input text, splitting the input text into n-grams while retaining a case of words as a feature, for each n-gram, determining whether it is a capitalized concatenated sequence of words and calculating a frequency of the n-gram's appearance in the input text relative to how rarely the n-gram is used in general use, identifying as a defined term each n-gram that is a capitalized concatenated sequence of words and has a relative frequency above a predetermined threshold, identifying a definition of each defined term from the input text, and displaying the definition of a defined term while also displaying a portion of the input text in which the defined term appears but that is different from a portion of the input text identified as the definition of the defined term.

In one example, the method further comprises cleaning the input text before the input text is split into n-grams by at least removing punctuation marks except for a predetermined plurality of punctuation marks to be retained.

In another example, the definition of a defined term is not displayed until a view of the input text is scrolled to display the portion of the input text in which the defined term appears but that is different from a portion of the input text identified as the definition of the defined term.

In another example, defined terms are displayed together with the input text even if the defined terms are not present in a currently displayed portion of the input text.

In another example, the defined terms are highlighted where they appear in a display of the input text.

In another aspect, a method for extracting information comprises receiving a standard text and a review text, analyzing the standard text and the review text to identify portions of those texts relevant to an input point of interest, displaying in a user interface a portion of text identified in the review text as relevant to the point of interest while also displaying any deviations therein from a portion of text identified in the standard text as being relevant to the point of interest.

In another example, the point of interest is one of a question, a topic, a named fact and a defined term.

In another example, the deviations are not displayed until a user clicks on the displayed portion of text identified in the review text as being relevant to the point of interest.

In another example, the portion of text identified in the standard text as being relevant to the point of interest is displayed upon a user clicking the portion of text identified in the review text as being relevant to the point of interest.

In another example, multiple portions of text are identified in the standard text as being relevant to the point of interest and are displayed upon a user clicking the portion of text identified in the review text as being relevant to the point of interest. In one example, any deviations between the portion of text identified in the review text as being relevant to the point of interest and each of the multiple portions of text are identified in the standard text as being relevant to the point of interest and are displayed.

In another example, the analysis of the standard text and the review text to identify portions of those texts relevant to an input point of interest includes using words of the input point of interest as query words and estimating a likelihood of those query words in document language models representative of portions of the reference text and portions of the standard text.

In another example, points of interest are displayed on the user interface and the portion of text identified in the review text as relevant to a particular point of interest is not displayed until a user click s on the display of that particular point of interest.

In another aspect, a method for detecting deviations in obligations, comprises receiving a standard sentence and a review sentence, classifying the standard sentence and review sentence, identifying any actors, obligations and restrictions in the standard sentence and review sentence, and identifying any differences between actors, obligations and restrictions of the standard sentence and review sentence.

In one example, the identification of any obligations includes selecting and applying an obligation detection tool from among a plurality of obligation detection tools based on a classification of the sentence to which the tool is to be applied.

In another example, the method further comprises identifying a modality of each obligation identified and identifying any difference between obligation modalities of the standard sentence and the review sentence.

In another example, the method further comprises if multiple obligations are identified in a sentence, splitting the sentence into sentence portions such that each sentence portion includes at most one obligation.

In another example, identifying restrictions includes identifying the presence in a sentence of any of a predetermined plurality of restriction trigger words.

In another example, the method further comprises highlighting an identified obligation in a user interface.

In another example, the method further comprises compiling identified obligations into a dictionary and passing the dictionary back to a requestor of the obligation deviation detection.

In another example, the method further comprises pre-processing the standard sentence and review sentence by replacing any agents referenced as anaphora with a different text string to which the anaphora refers.

In another example, identifying differences between agents includes calculating a non-binary similarity metric between agents identified in the standard sentence and in the review sentence.

In another example, multiple review sentences are received, obligations are identified in the multiple review sentences, and the method further comprises identifying the most similar obligation identified in the multiple review sentences to an obligation identified in the standard sentence. In one example, if an obligation is not identified in the multiple review sentences for which a similarity to the obligation identified in the standard sentence is above a predetermined threshold, an indication is displayed on a user interface that the obligation identified in the standard sentence has been deleted from the multiple review sentences.

In another example, multiple standard sentences are received, obligations are identified in the multiple standard sentences, and the method further comprises identifying the most similar obligation identified in the multiple standard sentences to an obligation identified in the review sentence and if an obligation is not identified in the multiple standard sentences for which a similarity to the obligation identified in the review sentence is above a predetermined threshold, an indication is displayed on a user interface that the obligation identified in the review sentence has been added to the multiple standard sentences.

In another example, identifying differences between restrictions includes calculating a non-binary similarity metric between restrictions identified in the standard sentence and in the review sentence and only indicating a difference in restriction if the similarity metric between restrictions is below a predefined threshold.

In another example, the method further comprises displaying the standard sentence along with the review sentence on a user interface and highlighting any identified differences between the identified actors, obligations and restrictions. In one example, the method further comprises displaying an indication, written in words, of any identified differences between the identified actors, obligations and restrictions.

BRIEF DESCRIPTION OF THE DRAWINGS

The accompanying drawings illustrate various non-limiting, example, innovative aspects in accordance with the present descriptions:

FIG. 3 depicts examples of types of obligation changes and deviations detected and detectable by exemplary embodiments of the present innovations.

FIG. 6 depicts a representation of a training dataset using exemplary available feature sets.

FIG. 16 shows an exemplary user interface depicting the extraction and presentation of keyphrases in a text being reviewed.

FIG. 17 shows an example of a legal document containing a "Operating Costs" defined term.

FIG. 18 shows an example of a pop-up box presented to a user in a user interface.

FIG. 19 shows exemplary regex patterns that may be deployed to identify and extract defined terms.

FIG. 20 shows an example of a user interface relaying various named facts from a document being reviewed.

FIG. 21 shows an example of another user interface relaying various defined terms from a document being reviewed.

DETAILED DESCRIPTION

Embodiments of systems and methods for detecting deviations among documents and portions thereof, extracting information from documents and portions thereof, and detecting deviations between obligations in documents and portions thereof are described herein. While aspects of the described systems and methods can be implemented in any number of different configurations, the embodiments are described in the context of the following exemplary configurations. The descriptions and details of well-known components and structures are omitted for simplicity of the description, but would be readily familiar to those having ordinary skill in the art.

The description and figures merely illustrate exemplary embodiments of the inventive systems and methods. It will thus be appreciated that those skilled in the art will be able to devise various arrangements that, although not explicitly described or shown herein, embody the principles of the present subject matter. Furthermore, all examples recited herein are intended to be for illustrative purposes only to aid the reader in understanding the principles of the present subject matter and the concepts contributed by the inventors to furthering the art, and are to be construed as being without limitation to such specifically recited examples and conditions. Moreover, all statements herein reciting principles, aspects, and embodiments of the present subject matter, as well as specific examples thereof, are intended to encompass all equivalents thereof.

In general, the systems and methods described herein may relate to improvements to aspects of using computers to detect deviations among documents and portions thereof, extract information from documents and portions thereof, and detect deviations between obligations in documents and portions thereof. These improvements not only improve the functioning of how such a computer (or any number of computers employed in extracting structure and header information from documents) is able to operate to serve the user's document analysis goals, but also improves the accuracy, efficiency and usefulness of the deviation detection, information extraction and obligation deviation detection results that are returned to the user.

The tools described herein are particularly suited to legal documents and are generally discussed in that context, however it will be appreciated that many other types of documents, texts and users will benefit from the inventive tools disclosed and claimed herein.

In one aspect, the present innovations provide a novel mechanism to automatically compare a given document to an agreed upon standard document of the same type. The system identifies significant linguistic differences and flags these as potential legal issues to users for review. In contrast to existing tools, the system can handle reordering of sentences and paragraphs, and categorizes changes, allowing for prioritization and triage.

Figure 1:
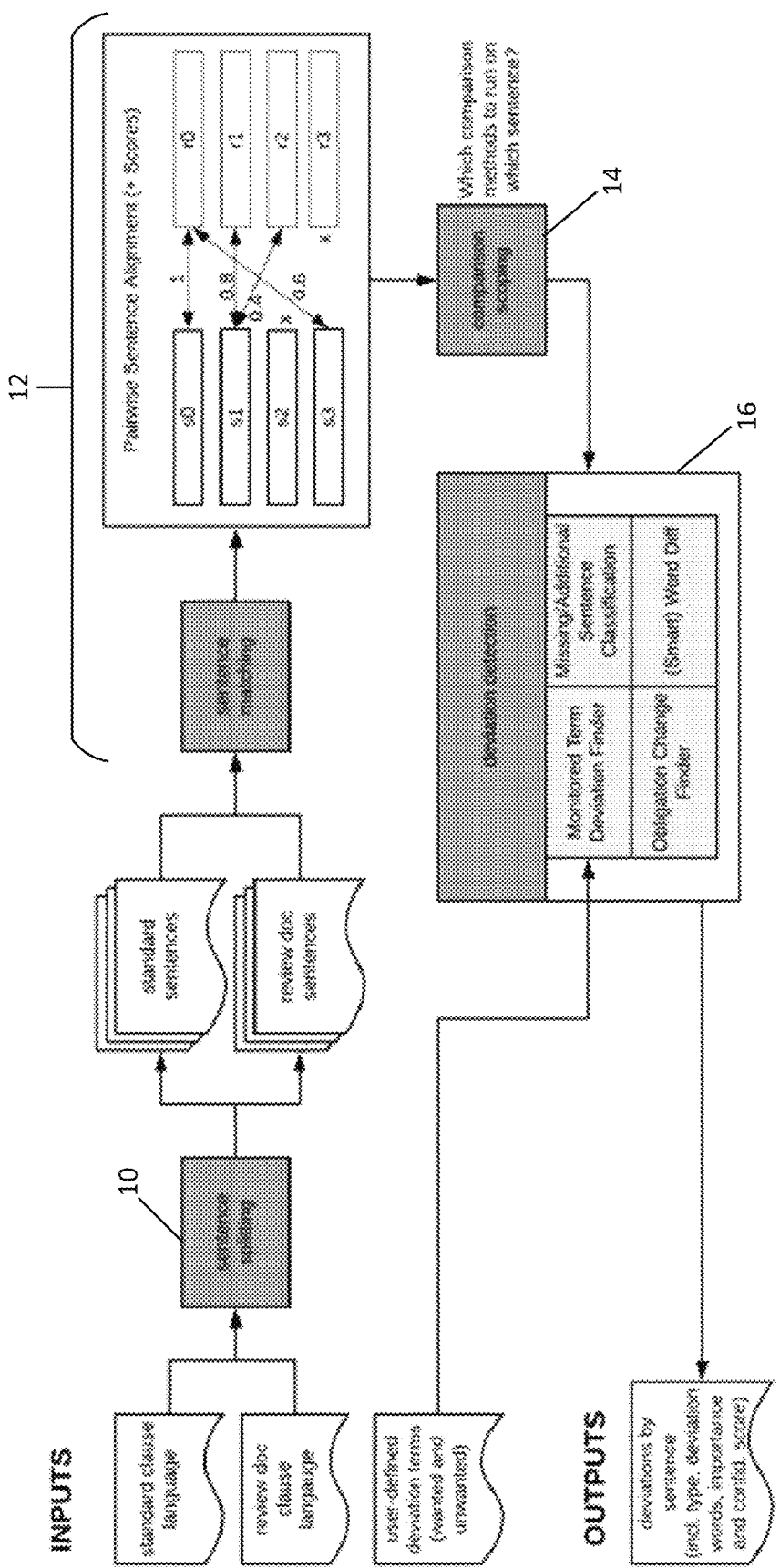
FIG. 1 depicts a flow chart of document comparison steps according to an exemplary embodiment of the present innovations.

In one example, document comparison may be performed at the clause or sentence level and executed in three key stages as shown in FIG. 1 and described in more detail below.

In the pre-processing stages, we use techniques for text splitting 10 (e.g., python nitk's sent_tokenize) and text similarity measures 12 (e.g. tf-idf vectorization+cosine similarity). The former allows for comparison and review at the sentence level. The latter aligns sentences from the standard document with sentences from the review document in a computationally cheap way to scope and reduce computation time of more complex comparison.

The aim of this task is to identify missing/additional sentences when comparing two clauses and find matches for sentences which are non-missing. Before this can be achieved, clauses are split into smaller chunks, usually sentences. This task is represented by the sentence splitting step 10 depicted in FIG. 1.

Sentence Splitting

The input into this task are two clauses, one from the reviewed document (for example, manually selected by the user via text highlighting) and one from a corresponding standard document. The output is the linking of sentences between the two documents.

An illustrative example of the sentence splitting task 10 based on one clause is shown in Table 1. In reality, this step could be performed on two clauses in parallel. An example for the sentence matching task is shown below.

TABLE 1

| | | |
|---|---|---|
| Whole Clause | | Eviction of tenant |
| | | 14. The Landlord reserves the right to evict the tenant if the tenant fails to comply with the terms of this lease. |
| | | (a) If the tenant fails to pay the rent within 5 business days of the date when it is due, the tenant is liable for eviction. |
| | | (b) The tenant must also pay all costs, including reasonable attorney fees, related to the eviction and the collection of any moneys owed to the landlord, along with the cost of re-entering, re-renting, cleaning and repairing the premises. |
| Sentence Splitting | s0 | Eviction of tenant |
| | s1 | 14. The Landlord reserves the right to evict the tenant if the tenant fails to comply with the terms of this lease. |
| | s2 | (a) If the tenant fails to pay the rent within 5 business days of the date when it is due, the tenant is liable for eviction. |
| | s3 | (b) The tenant must also pay all costs, including reasonable attorney fees, related to the eviction and the collection of any moneys owed to the landlord, along with the cost of re-entering, re-renting, cleaning and repairing the premises. |

In order to perform the sentence splitting, one approach is to split clauses on paragraphs (for example, as identified by a "\n" symbol in formatted text) first before using the punkt tokenize implementation of nitk, which splits strings of texts at sentence boundaries. In another example, a period "." is used to split text into sentences.

Table 2 shows another example of clause text and subsequent sentence splitting.

TABLE 2

| | | |
|---|---|---|
| Standard Clause - Raw text | | 25. Repairs |
| | | 25.1 The Tenant shall keep the Property clean and tidy and in good repair and condition and shall ensure that any Lifts and Service Media within and exclusively serving the Property are kept in good working order. |
| | | 25.2 The Tenant shall not be liable to repair the Property to the extent that any disrepair has been caused by an Insured Risk, unless and to the extent that the policy of insurance of the Property has been vitiated or any insurance proceeds withheld in consequence of any act or omission of the Tenant, any undertenant or their respective workers, contractors or agents or any person on the Property with the actual or implied authority of any of them. |
| Standard Clause - Sentence Splitting | s0 | 25. Repairs |
| | s1 | 25.1 The Tenant shall keep the Property clean and tidy and in good repair and condition and shall ensure that any Lifts and Service Media within and exclusively serving the Property are kept in good working order. |
| | s2 | 25.2 The Tenant shall not be liable to repair the Property to the extent that any disrepair has been caused by an Insured Risk, unless and to the extent that the policy of insurance of the Property has been vitiated or any insurance proceeds withheld in consequence of any act or omission of the Tenant, any undertenant or their respective workers, contractors or agents or any person on the Property with the actual or implied authority of any of them. |
| Review Clause - Raw Text | | Tenant's covenants for repair |
| | | 22.1 The Tenant shall put and keep the Property clean and tidy and in good and substantial repair and shall ensure that any Service Media within and exclusively serving the Property is kept in good operating order. |

TABLE 2-continued

| | | |
|---|---|---|
| | | 22.2 The Tenant shall not be liable to repair the Property to the extent that any disrepair has been caused by an Insured Risk, unless and to the extent that the policy of insurance of the Property has been vitiated or any insurance proceeds withheld in consequence of any act or omission of the Tenant, any undertenant or their respective workers, contractors or agents or any person on the Property with the actual or implied authority of any of them. |
| | | 22.3 The Tenant shall clean the inside and outside of all windows at the Property as often as is reasonably necessary. |
| | | 22.4 The Tenant shall replace any plate glass or other window that becomes cracked or broken as soon as practicable. |
| Review Clause - Sentence Splitting | r0 | Tenant's covenants for repair |
| | r1 | 22.1 The Tenant shall put and keep the Property clean and tidy and in good and substantial repair and shall ensure that any Service Media within and exclusively serving the Property is kept in good operating order. |
| | r2 | 22.2 The Tenant shall not be liable to repair the Property to the extent that any disrepair has been caused by an Insured Risk, unless and to the extent that the policy of insurance of the Property has been vitiated or any insurance proceeds withheld in consequence of any act or omission of the Tenant, any undertenant or their respective workers, contractors or agents or any person on the Property with the actual or implied authority of any of them. |
| | r3 | 22.3 The Tenant shall clean the inside and outside of all windows at the Property as often as is reasonably necessary. |
| | r4 | 22.4 The Tenant shall replace any plate glass or other window that becomes cracked or broken as soon as practicable. |

After the splitting, every clause may be assigned a clause ID and every sentence may be assigned a sentence id. A sentence id from the standard always starts with the character 's' followed by the number/order of the sentence in the clause (i.e. the first sentence from the standard document would be labelled 's0' or sometimes 's1'). Similarly, a sentence id from the review document will start with the character 'r' and again followed by the number that represents the order of the sentence in the clause text. We are assuming that matching sentences are found in the matching clauses. In a scenario where the matching sentences are identified in distinct clause types, then the clauses that contain all matching sentences may be merged to one and assigned a single clause ID. We later modified the sentence id convention to include the clause id as well, to allow cross-clause comparison i.e. a matching sentence can be found in different clauses within the document (i.e. sentence id 's1' of clause id 'CC' became 's1CC').

Table 3 and Table 4 present a matching schema of the example clauses of Table 2. The matching can occur in two directions: from the standard document to the review document (Table 3) and from the review document to the standard document (Table 4). A sentence can be matched to one or multiple sentences. In the scenario of multi-sentence matching, the matched sentence ids are separated by comma (i.e. s1->r1, r2, r3 means that the sentence s1 of the standard is matching to all three sentences r1, r2, r3 of the review document).

TABLE 3

| Clause name | Comparison Reference | from | to |
|---|---|---|---|
| Repairs | CC | s1 | r1 |
| Repairs | CC | s2 | r2 |

TABLE 4

| Clause name | Comparison Reference | from | to |
|---|---|---|---|
| Repairs | CC | r1 | s1 |
| Repairs | CC | r2 | s2 |

TABLE 4-continued

| Clause name | Comparison Reference | from | to |
|---|---|---|---|
| Repairs | CC | r3 | None |
| Repairs | CC | r4 | None |

In one example, sentences are preprocessed according to one or more of the following operations: lower case, removal of numbers as tokens and removal of any numbered or lettered list items (i.e. (a), 12.1) or similar at the beginning of the sentence.

Basic features between sentences may be compared, for example:
  1. Length of sentence 1
  2. Length of sentence 2
  3. Difference between the lengths
  4. Character length of sentence1 without spaces
  5. Character length of sentence2 without spaces
  6. Average length of word in sentence1
  7. Average length of word in sentence2
  8. Number of words in sentence1
  9. Number of words in sentence2
  10. Number of common words in sentence1 and sentence2
  11. Difference of sets Fuzzy features may be generated by the fuzzywuzzy python library which is based on the difflib.ratio implementation but calling the method with different subsets of tokens from the original sentence. The features considered between sentences may include, for example, any of the following:
  1. QRatio
  2. WRatio
  3. Partial Ratio
  4. Partial Token Set Ratio
  5. Partial Token Sort Ratio
  6. Token Set Ratio
  7. Token Sort Ratio A tf-idf vectorizer may be trained on the corpus from training datasets using unigrams and bigrams. After the generation of the sentence vectors (size=7869), vector distances may be calculated using any one or more of Cosine, Euclidean and Manhattan metrics.

Singular Value Decomposition (SVD) lower dimensionality vectors may also be generated (n_components=180, accounting for >0.85 of variance). For example, the Truncated SVD implementation of the sklearn python library may be used. In addition, bag of words (bow) based vectors may be generated by training a count vectorizer. The count vector distances were then calculated using one or more of the following metrics: Jaccard, Overlap coefficient, Dice, and Jaccard+Overlap coefficient.

To generate a domain specific language model, a gensim python library may be used to train a word2vec language model on a set of exemplary documents, for example US lease documents. In one example, the size of the resulting vocabulary was ~15K which is limited but the model could already capture domain specific word similarities better than the spacy generic model (i.e. property—premises, landlord—lessor, Table 5).

TABLE 5

| Word 1 | Word 2 | w2v Similarity Score | Spacy Score |
|---|---|---|---|
| Property | Premises | 0.70 | 0.55 |
| Landlord | Lessor | 0.94 | 0.48 |
| Tenant | Lessee | 0.92 | 0.64 |
| Landlord | Tenant | 0.91 | 0.83 |
| Includes | Including | 0.72 | 0.75 |
| Pay | Return | 0.45 | 0.42 |
| Improvement | Inspection | 0.36 | 0.38 |
| Leave | Run | 0.25 | 0.42 |

7. Skew
8. Kurtosis
9. Wmd (word mover's distance)

A representation of the training dataset using all available feature sets is represented in FIG. 6.

Besides exploration of the performance of the different feature sets, additional exploration was performed on the effect of the training data. For example, training a classifier using high deviation gold data may result in better ability to predict similarity of high deviating leases. Therefore, the specific training dataset used is highlighted when relevant.

In one example, Leave One Group Out cross validation (sklearn) may be performed to allow for clause-based stratifications using the groups as the clauses. Hyperparameter grid search may be performed according to each classifier type.

The classifiers' performance may examined for two different document type examples: a low-medium deviation lease and a high deviation lease. As shown in Table 8, for the low deviation example, the best classifier is a gradient boosting classifier trained on all three leases, substantially outperforming the benchmark based on tf-idf vector cosine distance (one single feature with a threshold). For the high deviation example, the best model was also a gradient boosting classifier but this time trained on the training subset only, which is also characterized by a high degree of deviation. For both classifiers, the feature set used for training contains the basic, tf-idf based distances, count vectorizer based distances, and w2v vector based distance features.

TABLE 8

Best models per lease type.

| Matching Classifier | Features | Training* | Refit | Low-Medium Deviation Lease | | | High Deviation Lease | | |
|---|---|---|---|---|---|---|---|---|---|
| | | | | Precision | Recall | F1 Score | Precision | Recall | F1 Score |
| Benchmark | tfidf cosine | 1, 2, 3 | f1 | 0.45 | 0.91 | 0.60 | 0.64 | 0.26 | 0.37 |
| Gradient boosting3 | Basic, tfidf/bow/ w2v dist | 1, 2, 3 | Precision | 1.00 | 0.85 | 0.92 | 0.57 | 0.05 | 0.09 |
| Gradient boosting4 | Basic, tfidf/bow/ w2v dist | 3 | f1 | 0.37 | 0.65 | 0.47 | 0.5 | 0.34 | 0.41 |

The training data are separated in the three leases used (1: Nitya - dummy US, 2: Louise Practical Law UK. 3: Louise DWF UK). The performance is also presented according to the two different test datasets (AL2 - low deviation, LouiseJan19LS - high deviation).

Figure 7:
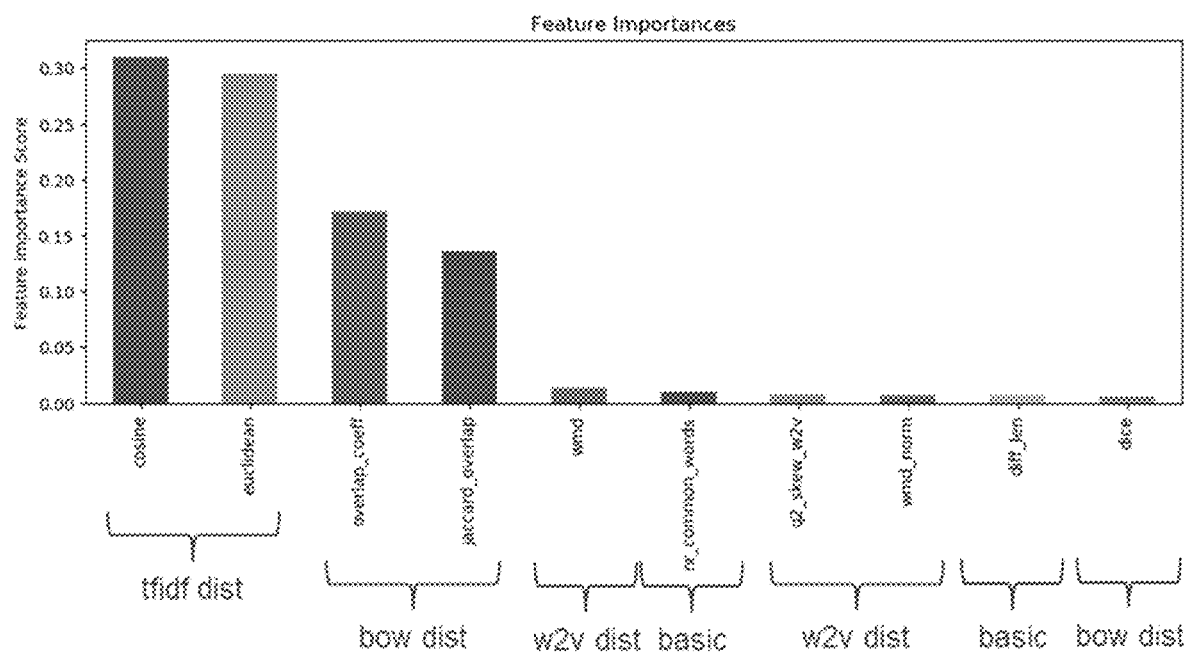
FIG. 7 presents the top 10 most important features for the gradient boosting classifier that performs the best for the low deviation lease example.
Figure 8:
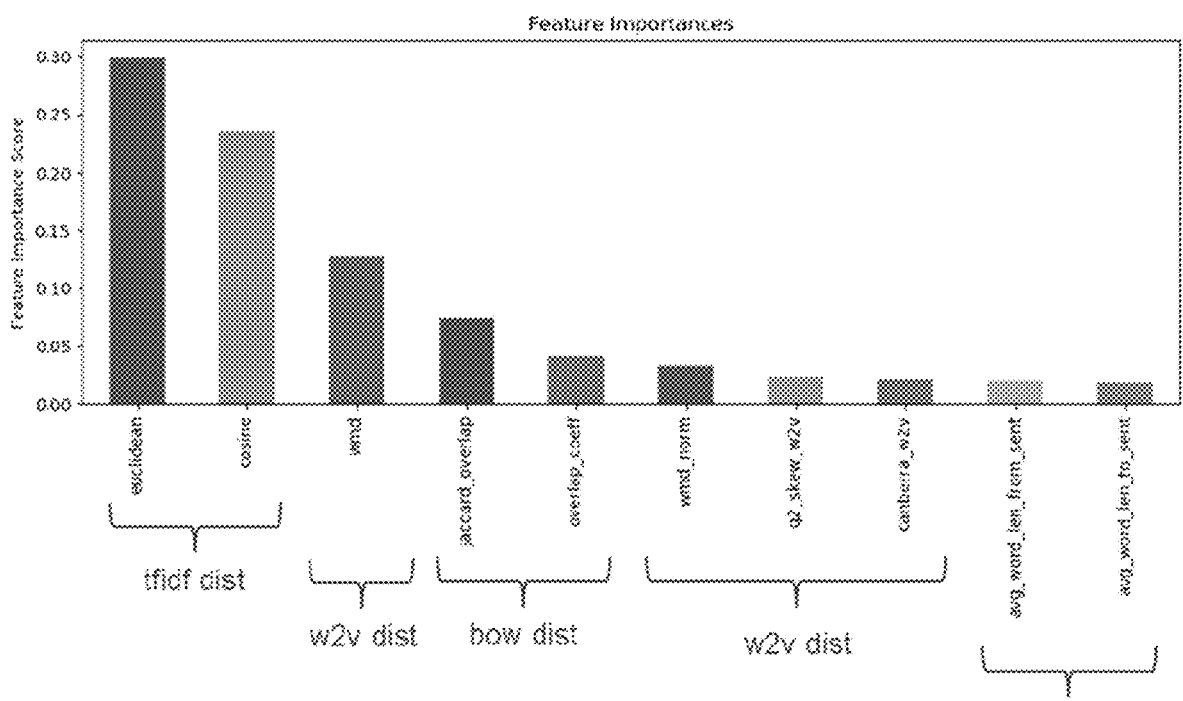
FIG. 8 presents the top 10 most important features in the case of the high deviation lease example.

In addition, different ways of generating the sentence embedding from the word embeddings may be used. For example, possible techniques include i) summing the word vectors, ii) averaging the word vectors and iii) using tf-idf weighting scheme of the words in the sentence to generate the sentence vector (for the effects of the different sentence embedding approaches on the classifier score, see Table 9). Based on the sentence vectors, one or more features may be generated including, for example:

1. Cosine distance
2. Euclidean distance
3. Manhattan distance
4. Canberra distance
5. Minkowski distance
6. Braycurtis distance FIG. 7 presents the top 10 most important features for the gradient boosting classifier that performs the best for the PL to PL, US, AL2 lease example (low deviation example). In FIG. 8, the 10 most important features in the case of the high deviation example are presented. Here w2v based features are more prominent which could be expected as in the high deviation example it is the semantic similarity, rather than the lexical, that plays a more decisive role in the matching. The tfidf based features remain however as the most important ones.

Different methods of sentence embeddings may also affect the classifier performance. Table 9 displays the different scores obtained using different strategies for sentence embeddings i.e. mean vs sum of word vectors, and using of the tfidf weighting scheme or not. Overall, there are no dramatic effects from the different sentence embedding strategies but the mean embedding with tfidf weighting slightly outperforms the other methods in terms of precision and it was therefore the preferred choice. Alternatively, the simple sum of the word vectors gives a slightly higher F1 score.

TABLE 9

| Matching Classifier | Features | Training * | Refit | PL to PL, US, AL2 (low deviation) | | | PL to WL, UK, LouiseJan19LS (high deviation) | | |
|---|---|---|---|---|---|---|---|---|---|
| | | | | Precision | Recall | F1 Score | Precision | Recall | F1 Score |
| Benchmark | tfidf cosine | 1, 2, 3 | f1 | 0.45 | 0.91 | 0.60 | 0.64 | 0.26 | 0.37 |
| Gradient boosting | w2v dist - mean with tfidf weighting | 3 | f1 | 0.79 | 0.70 | 0.74 | 0.51 | 0.23 | 0.31 |
| Gradient boosting | w2v dist - mean | 3 | f1 | 0.78 | 0.66 | 0.72 | 0.51 | 0.23 | 0.31 |
| Gradient boosting | w2v dist - sum with tfidf weighting | 3 | f1 | 0.46 | 0.69 | 0.58 | 0.46 | 0.25 | 0.32 |
| Gradient boosting | w2v dist - sum | 3 | f1 | 0.78 | 0.74 | 0.76 | 0.46 | 0.25 | 0.32 |

The skill of the sentence splitting and sentence matching algorithms are measured separately. When measuring the success of the sentence matching algorithm, we give it the perfectly split sentences as an input. Within the sentence matching task, we separate between the matching vs non-matching sentences classification and additional/missing vs non-missing sentence classification.

The matching vs non-matching sentences classification task tells us whether two sentences in different documents have comparable content and should therefore be matched up for further deviation analysis. For this task, we would prefer showing too many matches rather than too few.

The additional/missing vs non-missing sentence classification task on the other hand tries to identify sentences which either only occur in the standard but not in the reviewed document (a missing sentence) or the other way around (an additional sentence). For this task, it is important not to miss out on any missing/additional sentences as this could lead to undesired consequences for the end-user.

When reporting on the overall skill in terms of user experience, the sentence splitting and matching skills would have to be combined. The details on how those metrics are calculated is described in more detail below.
Sentence/Content Matching Documents or texts to be analyzed can vary wildly in length, from entire documents (e.g., contracts, legal briefs) to paragraphs (contract clauses) to individual sentences. For instance, the extent to which the original and amended regulations are different, or how similar are two sentences— these are just two examples from a wide variety of cases that lend themselves to text comparison.

In the context of contract analysis, content matching may require comparing fragments of text between a standard and a review contract. The text fragments are typically sentences discovered in the contracts, but can be as short as just a phrase or as long as multiple sentences.
Content/Keyphrase Matching At a high level, the "classic" machine learning approaches comprise feature representations such as tf-idf and count vectors, which are sparse and are well suited for modeling by algorithms such as SVM and random forest. These approaches were followed by neural networks where words are represented by dense vectors, or word embeddings, for example word2vec or fastText. These representations have performed well in neural network architectures, including RNNs, which consider word position in a sentence. More recently, contemporary language models such as Bert and XLNet fused feature learning and training into one model, with the embedding block in the model followed by a task-specific block, such as classification.

One important aspect of successful text similarity models in practice is domain adaptation. Training a model specific to the domain of interest, be it medical or legal, typically leads to a better performing model.

Figure 14:
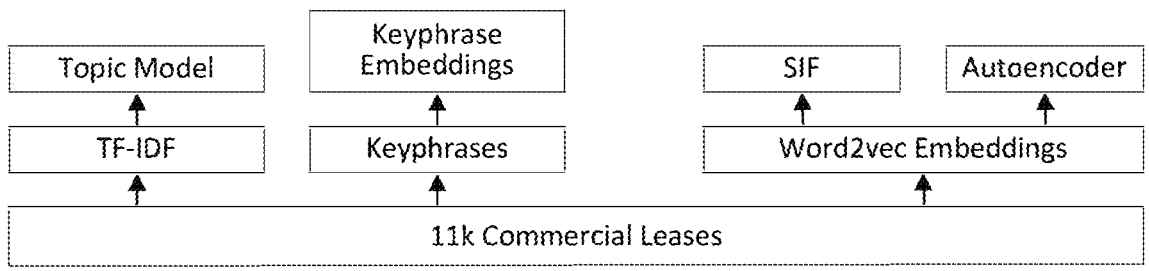
FIG. 14 shows several examples approaches used to convert text to features.

In one exemplary model, several approaches are used to convert text to features, shown in FIG. 14. All of them were trained on 11,000 exemplary commercial leases. Each feature converts a text of arbitrary length (e.g. a sentence) into a vector of fixed length.

Vocabulary for TF-IDF was learned from 1-, 2- and 3-grams in leases. Stopwords were omitted and vocabulary size was restricted to 10,000 most frequent tokens.

For the topic model, a non-negative matrix factorization (NMF) model was learned on the leases. The input features for the model were binary, using the same vocabulary as for TF-IDF but with binary indicators of whether a token was present in the document. 20 components (topics) were kept.

A list of keyphrases may be extracted from the exemplary commercial leases and used as the data input to a trained word2vec keyphrase embeddings analyzer. For example, for a pair of sentences, all keyphrases in both sentences are embedded and cosine similarities between all keyphrase embeddings from the first sentence and all from the second are calculated. The top 10 most similar scores are used as features.

SIF (Smooth Inverse Frequency) is an approach to sentence embedding based on embeddings of words in that sentence. This algorithm calculates a weighted average of word embeddings, projects them into a lower-dimensional space using PCA and removes the first principal component that accounts for most variations. The authors' explanation is that weighting "smoothens" the score by accounting for words that occur out of context, and removing the first principal component filters out the effect of the most common words.

In one example, word embedding analysis was trained on the exemplary 11,000 commercial leases. In one example, only weighting may be performed without reducing dimensionality. As a result, this feature may output a vector of size 100 for each sentence pair, for example.

A sequence-to-sequence autoencoder may be trained on sentences from the exemplary 11,000 commercial leases. For example, a random sample of 500,000 sentences was extracted and used for training. Sentences were padded or truncated to 50 words maximum. The architecture of both the encoder and the decoder was an LSTM cell unrolled over 50 time steps. The output of the last step of the encoder was used as the representation, or embedding, of the input sentence. The size of the embedding was set to 100.

Tokens in the input sentence were embedded using word embeddings trained on the commercial leases.

None of the features described above typically retain the information about the lengths of the two sentences. In practice, however, a five-word phrase could be compared to a 100-word passage. To retain this information, one may divide the number of words in the shorter sentence by the number of words in the longer sentence.

Figure 15:
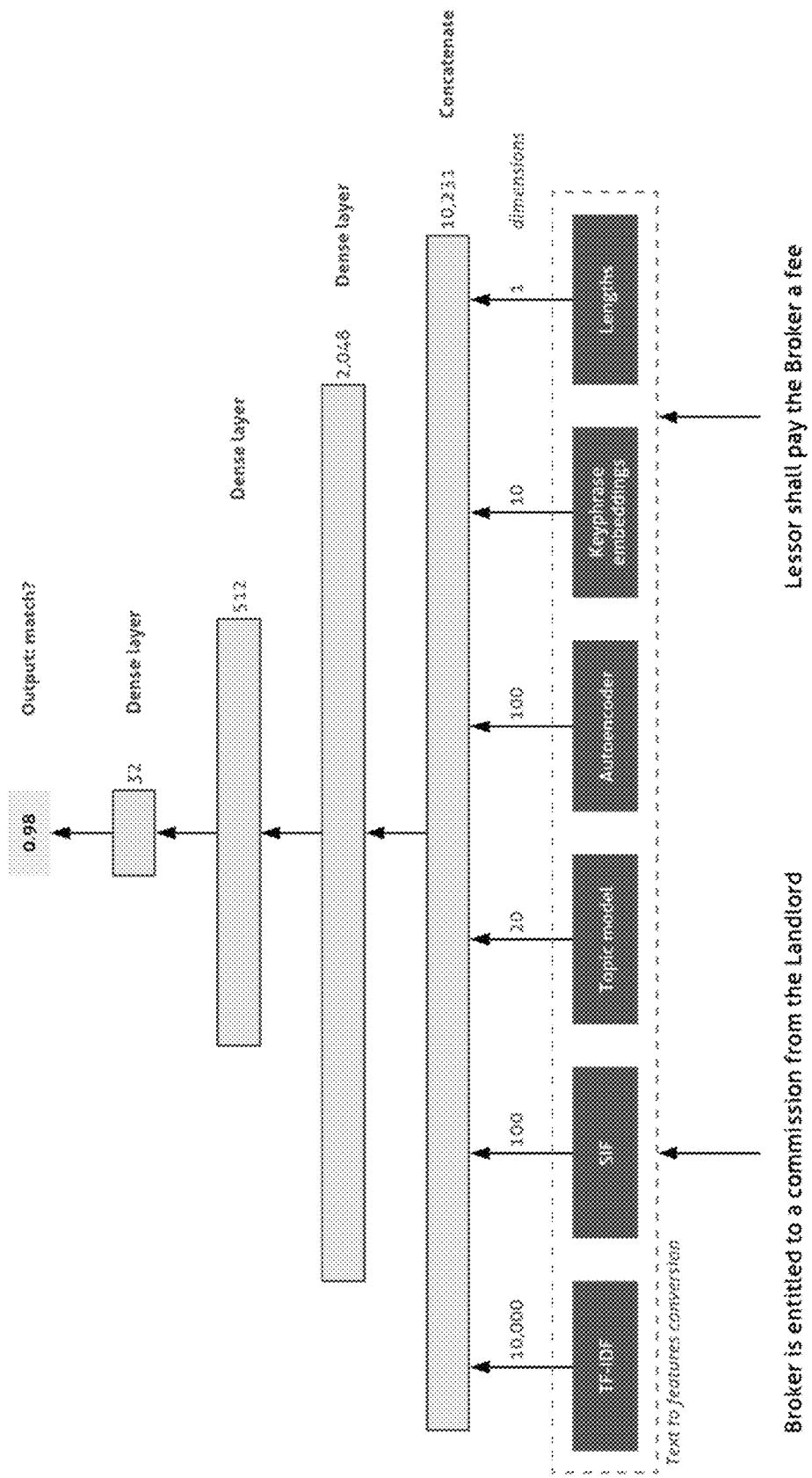
FIG. 15 shows an example of architecture of a model with a fully connected network.

In one implementation, these features may be fed into training algorithm models. In a demonstrative example, features are fed into different models: a random forest model (e.g., with 2500 estimators), a fully connected neural network (e.g., with three hidden layers: 2048, 512 and 32 units), and a Bert model. The first two models used the features described in the above. FIG. 15 shows the architecture of the model with the fully connected network. With the random forest model, the output of text-to-feature conversion is fed into a random forest model instead.

Sentence Matching

The two examples below illustrate the difference between two exemplary classification tasks we considered in terms of sentence matching. Table 10 shows the "gold" data we used as a baseline for the match vs no-match classification task and subsequent quality scoring.

TABLE 10

Gold data for the match vs no-match classification task.

| Clause | From | To | Gold Label |
|---|---|---|---|
| A | r0 | s0 | 1 |
| A | r0 | s1 | 1 |
| A | r0 | s2 | 0 |
| A | r0 | s3 | 0 |
| A | r1 | s0 | 0 |
| A | r1 | s1 | 0 |
| A | r1 | s2 | 0 |
| A | r1 | s3 | 0 |
| A | r2 | s0 | 0 |
| A | r2 | s1 | 0 |
| A | r2 | s2 | 1 |
| A | r2 | s3 | 0 |

'r' is used for a sentence from the reviewed document and 's' for the standard document. 1 = matching sentences and 0 = non-matching sentences according to a manual review.

Table 11 shows the gold data we have for the missing/additional vs non-missing classification task. It essentially contains the same information as Table 2, but a label is given per sentence in the reviewed document rather than per pairwise comparison. In this example, sentence r1 is identified as an additional sentence as it does not match up with any sentences in the standard document.

TABLE 11

Gold data for the missing/additional sentence identification task.

| Clause | From | To | Gold Label |
|---|---|---|---|
| A | r0 | s0, s1 | 0 |
| A | r1 | None | 1 |
| A | r2 | s2 | 0 |

'r' is used for a sentence from reviewed document and 's' for the standard document. 1 = missing/additional sentence and 0 = non-missing sentence.

Table 12 below shows how the decision whether or not two sentences are matched up was made. In order to obtain this information, similarity scores between all sentence pairs within a clause were calculated. The similarity score is based on cosine similarity of the corresponding tf-idf vectors (including bigrams). The sentences are pre-processed by putting everything into lower case, removing numbers as tokens, and removing any list numberings (e.g. (a) at the beginning of a sentence). Stopwords were not removed as tokens, as this did not seem to improve the classification task.

In the example below, we compute similarity scores between three sentences from the reviewed clause (r0-r2) and four sentences from the standard clause (s0-s3). The sentence comparisons are grouped into four classes depending on where their similarity scores fall.

TABLE 12

Matching diagram obtained from comparing three sentences from the reviewed clause (r0-r2) with four sentences from the standard clause (s0-s3).

| Score | Threshold | r0 | r1 | r2 | Label |
|---|---|---|---|---|---|
| 1 | T1 | s0 | | | (Near) Exact Match |
| — | | | s1 | s2 | Good Match |
| — | T2 | | | s1 | |
| — | | s2 | | s0 | Possible Match |
| — | T3 | | s1 | | |
| — | | s3 | s0 | | No match (=missing/additional) |
| — | | | s3 | s3 | |
| 0 | | | s2 | | |

In one implementation, threshold T1 may be set to 0.9 (near_exact_match_threshold), T2 to 0.36 (miss_add_sim_threshold), and T3 to 0.15 (matching_threshold), measured in terms of cosine similarity (based on tf-idf vectors). T1 and T3 may be chosen manually, but may also be set based on an optimizing of a computational cost function. One important threshold is T2, which was optimized based on a pre-defined cost function (maximum F1 score in this case).

Figure 4:
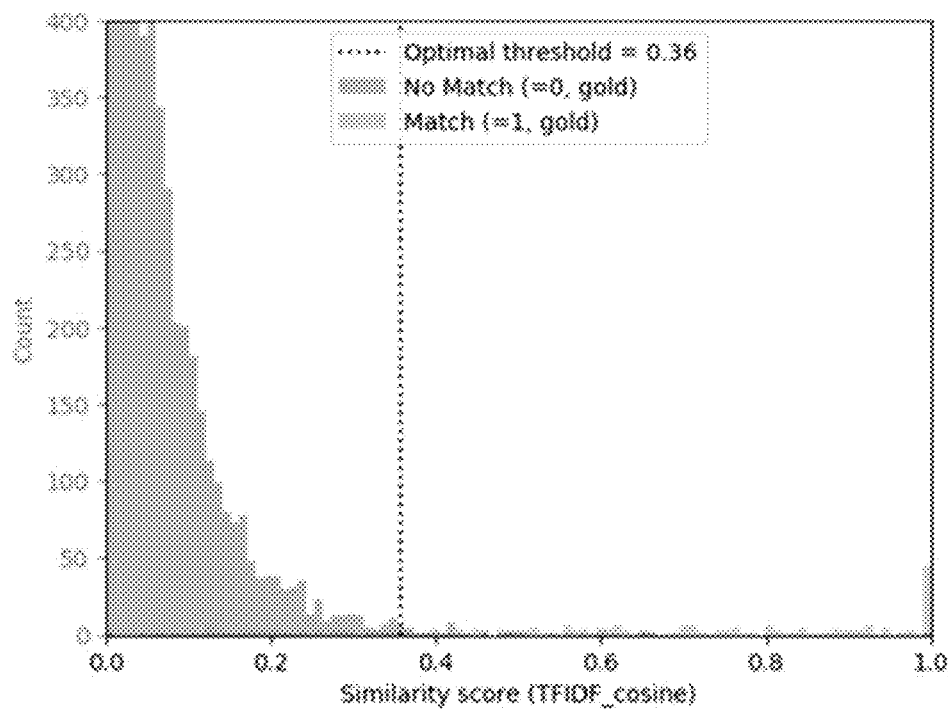
FIG. 4 depicts an exemplary distribution of similarity scores between matching and non-matching sentence pairs.
Figure 5:
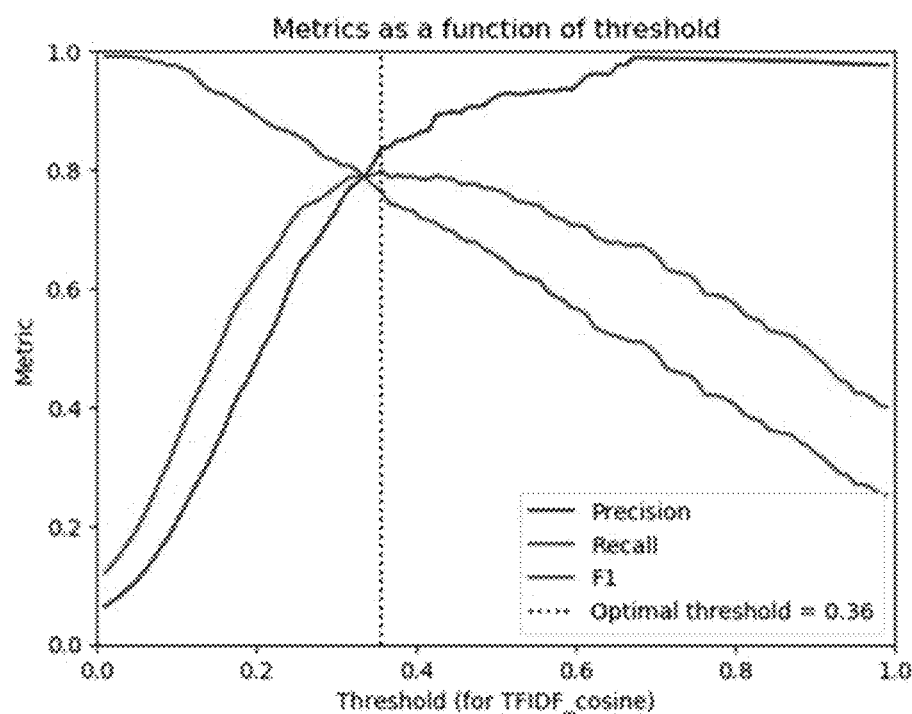
FIG. 5 depicts a graph of metrics dependent on threshold set.

The setting of the similarity thresholds may be guided by a statistical analysis. For example, as shown in FIG. 4, the distribution of similarity scores between matching and non-matching sentence pairs is depicted. An optimal threshold may be defined on this data, for example the T2 threshold shown. The optimal value for threshold T2 is obtained by moving the threshold along the x-axis and calculating F1 scores along the way, as shown in FIG. 5. The threshold with maximum F1 score may be selected as the threshold T2. A high F1 score signals that matching and non-matching sentence pairs can be well-separated. Orange sentence pairs to the left of the optimal threshold and blue sentence pairs to the right of the threshold are misclassified examples.

In addition to splitting text into sentences, it may be beneficial to break sentences into sub-sentences for the purposes of the present analysis. For example, long sentences may be constructed from multiple clauses separated by semicolons. In these instances, the clauses may find matches more readily on an individual basis than the entire sentence would.

In addition, short portions of text that initially are split as a sentence may be discarded to improve matching efficiency. For example, headers comprising a small number of words ending a period may be algorithmically identified as a "sentence," then they are not intended to be a sentence of prose and are not meaningful in a document deviation review activity.

Comparison Scoping

In the comparison scoping step 14, the system determines which parts of the document to compare further. Rather than running complex linguistic comparison methods on each pair of sentences from the standard and review clause, we only send pairs of sentences above a certain syntactic similarity threshold to the deviation detection routines 16. Each of the four deviation detection submodules incorporate their own criteria for what is considered a suitable input, as discussed below.

Deviation Detection

A key part of the analysis is to map the similar sentences between the two documents to detect their deviations. Another important functionality is to identify the missing/additional to the review document sentences when compared to the standard. The identification of missing/additional sentences is of high value for the customers as it could highlight potential high risks. The two tasks of matching and missing/additional detection are closely related in the sense that a sentence without a match is eventually a missing/additional sentence.

As one example, using the examples shown in Table 4, different approaches may be employed based on the similarity score and results found. For example, for a near exact match (e.g., r0->s0) a single sentence word diff may be performed. In one implementation, near matches like s0 may be removed from subsequent comparisons other than with their match like r0. As another example, reviewed clauses with no near exact or good matches (e.g., r1) may be flagged as an "additional sentence" with no good match, but all possible matches may be displayed to a user for manual review. As another example, for reviewed clauses with multiple good matches (e.g., r2->s2, s1), a multi-sentence word diff may be performed on all good matches.

In another exemplary embodiment, the deviation detection modules take a collection of sentences from the review document and compare them to similar sentences and terms from the standard. Linguistic differences between two contracts can vary in degree and kind of client risk/impact associated with them. To surface these differences to the user, we categorize the linguistic changes and distinguish between four classes of deviations as follows:

1. Missing/Additional Sentences,
2. Monitored Term Deviations,
3. Word Differences between Matching Sentence Pairs/Groups, and
4. Obligation Changes (incl. four different sub-categories)

Figure 2:
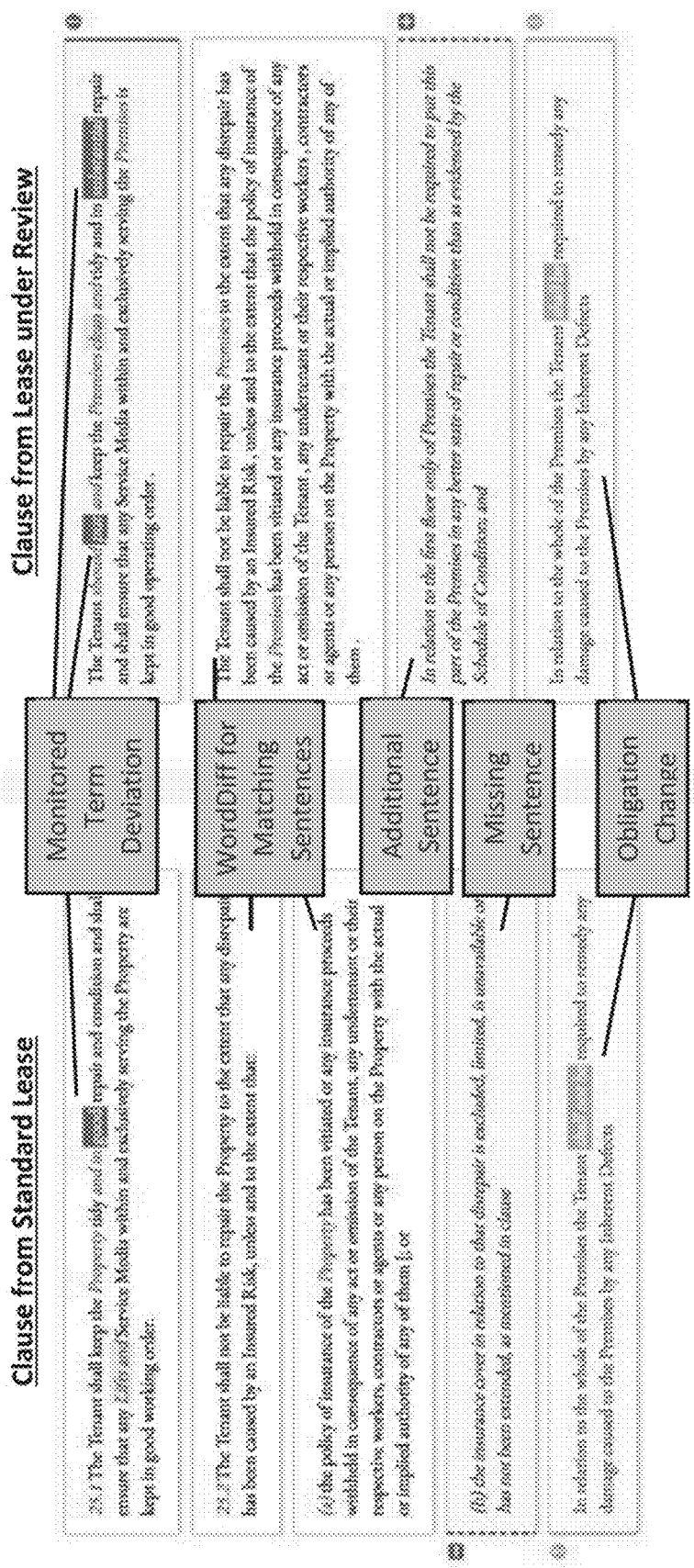
FIG. 2 depicts examples of types of deviations detected and detectable by exemplary embodiments of the present innovations.

Each type of deviation is identified through a separate text comparison method, which we describe above and in further detail in the following description. FIG. 2 provides representative, but non-limiting examples of each type.

An important and often very significant type of deviation from an agreed upon standard is the addition or deletion of whole provisions, sentences or even paragraphs. In order to support the user in identifying such changes, we added a missing/additional sentence classification component.

Missing/Additional Sentences

The missing/additional sentence classification component may be configured to classify each sentence from the review document as "additional" or not (meaning it "matches linguistically to a sentence in the standard") and each sentence from the standard document as "missing" or not. It uses the standard similarity metrics computed in the pre-processing step as features and standard classifiers (e.g. logistic regression) as decision mechanism.

A missing sentence is a sentence that is present in the review document but not in the standard document. An additional sentence is a sentence that is present in the review document but not in the standard document. Following from the previous sections, a sentence of the standard document that has no match in the review document is a missing sentence, while a sentence of the review document that has no match in the standard document is an additional sentence. As such, it is possible to use the classifiers trained in the previous section to identify the additional/missing sentences by looking at which sentences where never assigned a positive label by the classifier. In Table 13, the best sentence matching classifiers of Table 8 are used to predict the missing/additional sentences.

TABLE 13

| Add/Miss Classifier | Features | Training * | Refit | PL to PL, US, AL2 | | | PL to WL, UK, LouiseJan19LS | | |
|---|---|---|---|---|---|---|---|---|---|
| | | | | Precision | Recall | F1 Score | Precision | Recall | F1 Score |
| Benchmark | tfidf cosine | 1, 2, 3 | f1 | 0.71 | 0.84 | 0.77 | 0.44 | 0.87 | 0.58 |
| Gradient boosting | Basic, tfidf/bow/w2v dist | 1, 2, 3 | Precision | 0.74 | 0.95 | 0.83 | 0.37 | 1 | 0.54 |
| Gradient boosting | Basic, tfidf/bow/w2v dist | 3 | f1 | 0.60 | 0.76 | 0.67 | 0.45 | 0.82 | 0.58 |

Besides using the Sentence Matching Classifier for the additional/missing sentence identification, a new classifier may be created, specifically focused on the missing/additional task.

For the additional/missing sentence classifier the training data used were derived from the gold data described in the previous sections. The pairwise comparisons dataset was generated and the sentences were pre-processed as described before. Subsequently, all sentences that have at least one match got assigned to a negative class (not missing or additional) and all sentences that did not have a single match were assigned to a positive class.

Following, summary features were created based on the clause, direction and sentence id. More specifically, for each sentence ("from" column) a minimum distance to a sentence of the equivalent clause of the comparison document may be determined and the median distance of the "from" sentence to all sentences of the equivalent clause in the comparison document may be determined. We are basically trying to capture the most similar sentence in the equivalent clause but also the overall similarity of each sentence to the text in the equivalent comparing clause. For this analysis, the feature sets that were considered may be the ones that calculate the distances of the vectors: tfidf dist, bow dist and w2v dist (N=38).

Monitored/Named Fact/Term/Keyphrase Extraction and Deviation Analysis

In most review tasks, users often have a specific list of defined or monitored terms and provisions to check for them in a document and how they are represented. In order to support that part of a review, we include a mechanism for identifying deviations with regard to specific monitored terms. For each clause, the users specify a list of words or typed item (numbers or dates) for inclusion or exclusion from the clause body. The system then checks for occurrence in the text and flags any deviations accordingly.

Keyphrase extraction is an important means of automatically selecting a set of phrases that best summarize a given free text document. Keyphrases also provide semantic metadata that can improve the performances of various tasks including question answering, document classification, etc.

Figures 16, 17:
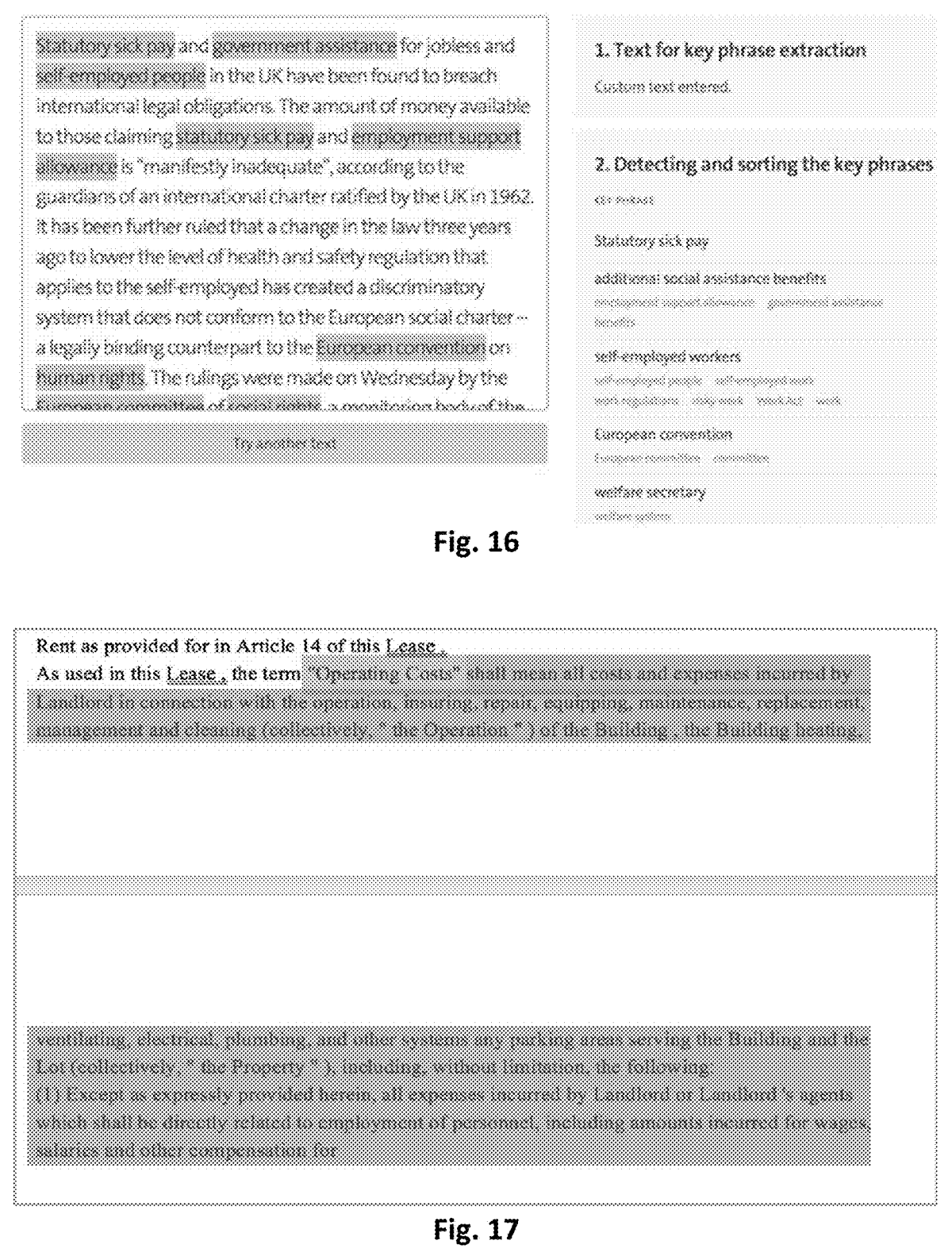

The example shown in FIG. 16 shows how keyphrases can summarize a given text. On the left-hand side, a free plain text is provided, once the keyphrases extraction process is done, a list of key phrases is provided—in this example, the phrases "Statutory sick pay", "additional social assistance benefits", "self-employed workers", "European convention" and "welfare secretary" are extracted. By only looking at these phrases, one may conclude that the topic of the text is about benefits related to sickness for self-employed workers in Europe.

As mentioned above, another benefit keyphrases provide is adding semantic metadata to the document to improve the performance of various tasks. It may be desirable to use keyphrases as features for the underlying applications including question answering and content matching. Below is an illustration of how key phrases can be used as features.

Input text: "someone who, immediately before a proposed assignment, is either a guarantor of the Tenant's obligations under this Lease or a guarantor of the obligations given by a former tenant of this Lease under an AGA;"

Word as tokens: ['proposed', 'obligations', 'is', 'an', 'Lease', 'given', 'assignment', 'former', 'Tenant's', 'under', 'before', 'someone', 'AGA', 'immediately', 'by', 'tenant', 'a', 'this', 'of', 'guarantor', 'who,', 'either', 'the', 'or']

Include Keyphrases as tokens: ['proposed assignment', 'obligations', 'is', 'an', 'this Lease', 'given', 'former tenant', 'Tenant's', 'under', 'before', 'someone', 'AGA', 'immediately', 'by', 'a', 'of', 'guarantor', 'who,', 'either', 'the', 'or']

Note that some phrases (e.g., "this Lease") may contain more information related to the meaning of this text than the individual words which means by using the phrases to represent the meaning of the text will give more accurate results.

There are several possible approaches for keyphrase extraction. For example, in a rule-based linguistic approach, the rules are derived from the linguistic knowledge/features such as lexical feature, syntactic feature, discourse feature, etc. Usually, it's more accurate but is computationally intensive and require domain knowledge in addition to language expertise. In this approach, after identifying candidate phrases, a set of linguistic features can be applied to filter out the noisy ones. One of the common linguistic features people use is parts of speech (POS) of the phrase constituents.

In another approach, a statistical approach, statistical features derived from the linguistic corpus are used. They are independent of the language and domain of the corpus and typically only the availability of a large amount of datasets can make it possible to achieve good results. In this approach, keyphrases may be extracted by calculating the standard deviation of the distance between successive occurrences of a word as a parameter to quantify the self-attraction based on the intuition that important words of a text have a tendency to attract each other and form clusters.

In another approach, a machine learning approach, supervised learning methods are employed where the keyphrases are extracted from training documents to learn a model. This approach includes Naive Bayes, Support Vector Mchine, etc. These methods require a tagged document corpus which may be difficult to obtain. A keyphrase extraction algorithm may be a binary classifier based on the Baye's theorem. The algorithm may analyze the input document on orthographic boundaries such as punctuation marks, newlines, etc. to find candidate phrases, and creates two features for the phrases that are tf-idf and the first occurrence of them to fit into the classifier.

In another approach, a domain-specific approach, back-end knowledge related to the domain such as ontology and inherent structure of that particular corpus may be exploited to identify and extract keyphrases. For example, a contrastive approach to extract keyphrases may be employed, especially from the underlying domain corpora. A contrastive ranking may be used that is based on the idea that keyphrases from the domain should have different distributions from the ones obtained from the general corpus. The contrastive weight may be used to standout the domain-specific keyphrases.

In still another approach, some of these other approaches may be combined and may be used in connection with an existing source of domain knowledge to customize the approach for a particular domain, for example the review of legal documents or contracts. In this approach, four general steps are executed:

1. Dictionary look-up: in a legal context, law dictionaries may be used, for example (1) Black's Law dictionary which is a publicly available legal dictionary of law definitions and terms for over 100 years and (2) Novas Phrases dictionary which is a proprietary dataset owned by Thomson Reuters to look up key phrases from an underlying legal document.
2. Identify candidates: A rule-based feature is included and a statistical feature is calculated for each multi-word term and a set of candidates is chosen by setting up a threshold.
3. Filtering by linguistic patterns: A list of part-of-speech patterns is created and candidates are filtered out that do not follow the patterns.

4. Filtering by semantic similarity: The candidate set is further filtered out by only keeping the ones that have high semantic similarity with a list of predefined topics.

The key phrases identified from the first step are kept to the end while the candidate keyphrases identified through step two to step four are filtered by the corresponding criteria.

In one example of a dictionary look-up operation, two law dictionaries are used to look up keyphrases for legal documents:

Black's Law Dictionary: The Black's Law Dictionary is a publicly available and trusted legal dictionary of law definitions and terms for over 100 years. The n-grams (n≥2) may be extracted from the dictionary which results in 28,981 number of unique phrases.

Novas Phrases dictionary: The Novas Phrases dictionary was created by mining anonymized Westlaw user logs with at least 6 years of log data where the Westlaw is an online legal research service for lawyers and legal professionals in the United States and the United Kingdom. After cleaning the data, 169,224 unique phrases were gathered.

All text and phrases from dictionaries may be lowercased before the looking up process.

Candidate phrases may be identified and chosen in steps. First, the input text is cleaned, then features may be obtained for each multi-word term. Terms with the feature that meets a requirement or with a score above a threshold will be kept to the next step.

To clean the input text, one approach is to remove the punctuation marks except for the comma(,), hyphen(-), apostrophes('), brackets(( )) and dollar sign($) from the text. Then, the cleaned input text may be split into n-grams where 2≤n≤4 by white space. The original case of the word may be kept as a feature of an n-gram.

Any number of features may be considered. For example, two features may be considered for each candidate n-gram. In one example, the features considered are: capitalized concatenated sequence of words, a way attorneys define a term which carries legal meanings; and TF×IDF feature which is a measure of an n-gram's frequency in a document compared to its rarity in general use. This can be used to remove noise n-grams that have few appearances in a document and common n-grams that appear in almost every document that does not carry legal meanings.

One way attorneys define a term is by concatenating a sequence of capitalized words. This kind of term is named as a "defined term" which usually conveys legal meanings. Therefore, a rule may be set up to extract the defined terms is finding n-grams where each word is capitalized. The n-grams that follow the rule are kept as good keyphrases.

Defined terms can usually be found at the beginning of a legal document, or at the beginning of a stand-alone section such as a schedule. The first letter of each word in a defined term is capitalized so that the reader can identify that the meaning of the term is "different" or specific and that he would interpret what he is reading in accordance with the definition given. Once the defined terms are defined somewhere in the document, the rest of the document will typically just refer the term without redefining it.

Defined terms can be a problem for lawyers. For example, if a term is defined in the 5th page of the document, by the time a reviewer reaches the 100th page, they may forget the definition of the term, so they will have to go back and find the definition on the 5th page. If they forget that it is defined on the 5th page, then further time will need to be spent finding the definition. Accordingly, in addition to identifying and extracting defined terms, a useful tool provided by the present innovations is a "magnifier" tool for aiding review of legal documents by providing a user interface that is configured to provide definitions of defined terms at the time that those defined terms are displayed in the body of the document, regardless of where in the document is being currently reviewed and shown to the user.

The magnifier will first walk through the whole document, identify all the defined terms and their associated definitions and remember them. Then, once a defined term is presented in the document, a box will be popped up showing the definition of the term. Therefore, users will not have to go back and try to search for where the term was defined.

FIG. 17 shows an example of a legal document containing a "Operating Costs" defined term. FIG. 18 shows an example of a pop-up box presented to a user in a user interface when the user is reviewing another portion of the document in which the defined term "Operating Costs" appears.

Figure 21:
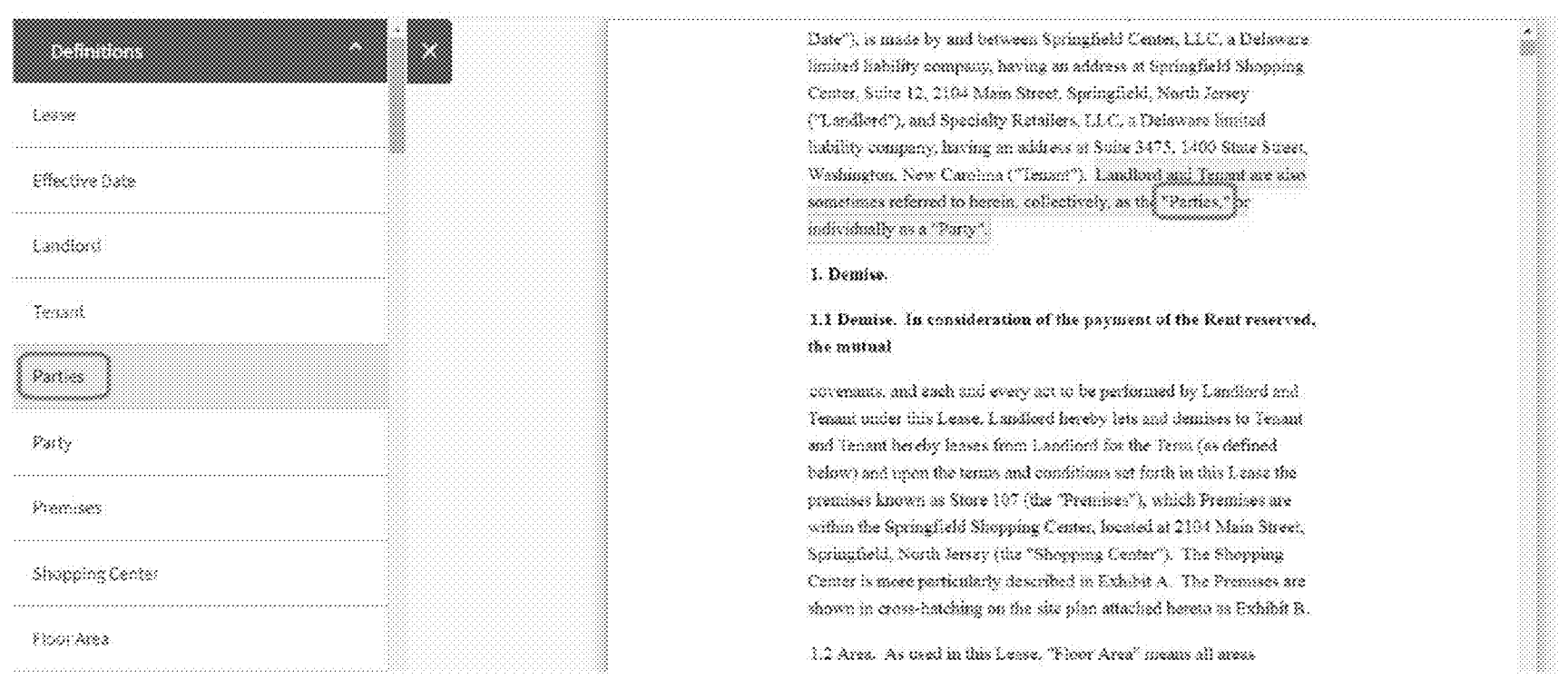

An example is shown in FIG. 21 of another user interface relaying various defined terms from a document being reviewed.

Detecting the defined terms and their definitions is not always an easy task due to the fact that there is no standard, unified way to create the defined terms. When lawyers create a document, they tend to use a different style, and style can vary from jurisdiction to jurisdiction. Defined terms may be defined anywhere throughout a document with double quotes or capitalized letters which may imply that setting up a rigid set of rules to find them may not be scalable.

In one approach, a two level review of a subject document may be conducted to determine whether defined terms are present and, if they are, what they and their definitions are.

To determine whether defined terms are present, a universal language model fine-tuning for text classification (ULMFit) model may be employed to indicate whether a piece of text contains defined terms or definitions. The model is a deep neural network that utilized the idea of transfer learning which first builds a language model by using the Wikipedia dataset to learn the relationships between words, then the language model is fine-tuned by fitting in the domain-specific dataset, in our case, it's the legal documents. After this, the language model will update the relations between words that make sense in the legal domain. After that, a downstream classification layer is added to the neural network to classify the input text.

Once text is identified that contains defined terms and definitions, they are extracted from the text. Two exemplary approaches for this extraction include creating a list of regex patterns and training an entity recognizer. For example, FIG. 19 shows exemplary regex patterns that may be deployed to identify and extract defined terms. Utilizing regex patterns and training an entity recognizer may also be used in combination to identify and extract defined terms and their definitions.

The TF×IDF feature compares the frequency of an n-gram's use in a particular document with the frequency of that n-gram across the corpus which is represented by the number of documents containing the n-gram. The TF×IDF feature may be calculated for n-grams with a single n at a time instead of mixing 2≤n≤4 at the same time which shows better performance. The n-grams with TF×IDF score above a threshold are carried to the next steps.

To further reduce noise, a list of linguistic patterns may be extracted from the aforementioned two dictionaries. The linguistic patterns may be extracted by concatenating the part-of-speech(POS) tag of each word in a phrase. Table 14 below shows examples of linguistic patterns

TABLE 14

| Phrase | Linguistic Pattern |
| --- | --- |
| spurious interpretation | ADJ NOUN |
| property-disclosure statement | NOUN PUNCT NOUN NOUN |
| term to conclude | NOUN PART VERB |
| commercial letter of credit | ADJ NOUN ADP NOUN |

Lastly, a filter may be applied to select the key phrases that are most relevant to a particular focus of a user, for example commercial leases. Accordingly, a manually created list of topics may be compiled (e.g., "lease", "commercial", "contracts", etc.) and the semantic similarity between each of the candidate key phrases and the topics may be calculated. A threshold may be enforced to keep the ones with high semantic similarity scores as a final list of key phrases.

After the process of the above steps on exemplary commercial leases, a list of 2-word phrases, 3-word phrases, and 4-word phrases may be obtained separately. These may be used in the other comparison and matching applications described herein.

In another aspect, a tool is implemented to locate portions of a document (spans of text) that may include the answer to a specific query or question or be relevant to a particular topic. For example, in the context of a contract review, a user might be interested in an answer to the question "Is the contract assignable?" or "What are the indemnification obligations?". Questions may also be represented as topics—for example "assignment," indemnification," etc.

In one approach, each question is treated as a set of query words and each text span as a document. In one example, a word embedding-based translation language model is implemented. In this approach, documents may be ranked based on the probability that they are relevant to the query q. Therefore, the Relevance Status Value (RSV) of the query q and document d is defined as:

$$RSV(q,d)=p(d|q)$$

Using Bayes rule, we have:

$$RSV(q, d) = \frac{p(q|d)p(d)}{p(q)}$$

Ignoring the constant p(q), and replacing d by its language model \theta_d (i.e., the probability distribution of terms of the vocabulary in d), we have $$RSV(q,d) \approx_{rank} p(q|\theta_d)p(d)$$

We use the clause type scores calculated by the binary classifiers as the prior probability p(d) and use Dirichlet Language Model to estimate the likelihood of query words in the document language model.

Figure 22:
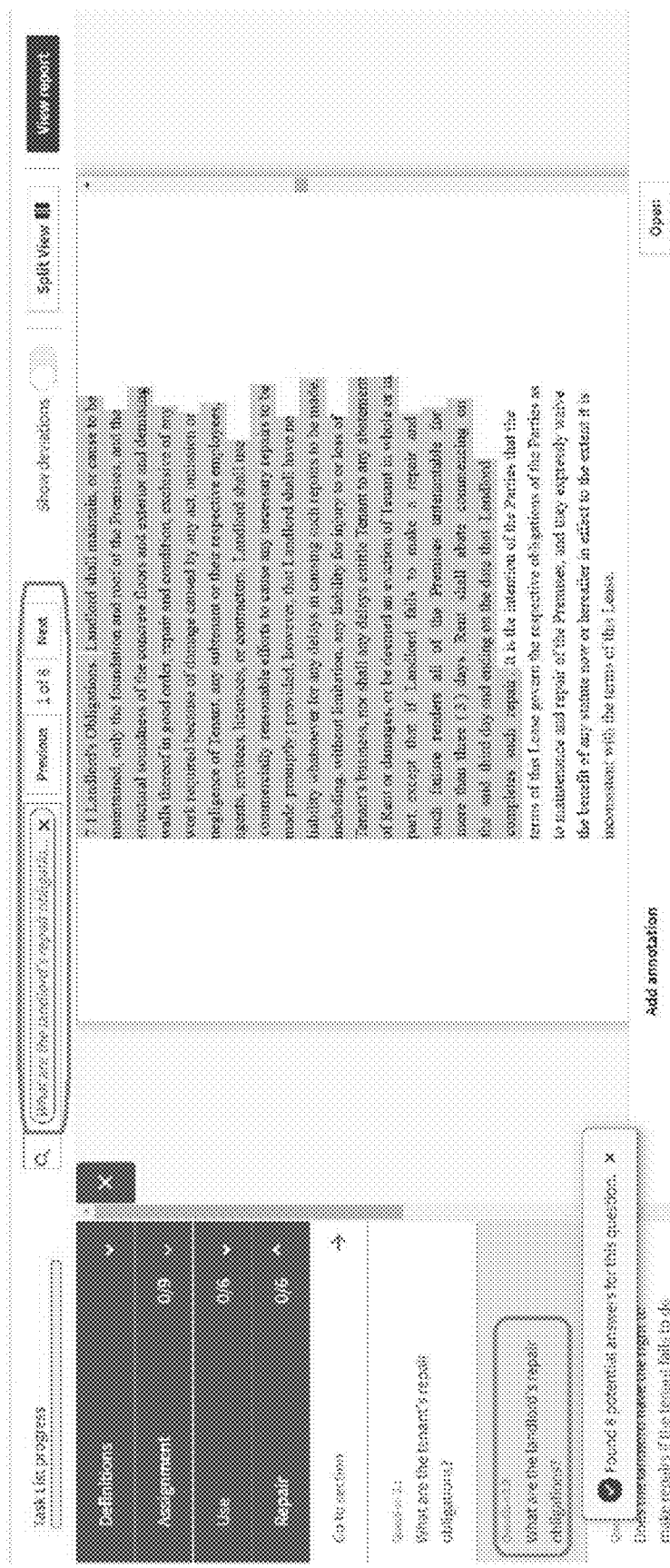
FIG. 22 shows an example of a user interface depicting the result of a question analysis and answer extraction tool.

FIG. 22 shows an example of a user interface depicting the result of a question analysis and answer extraction tool.

Figure 20:
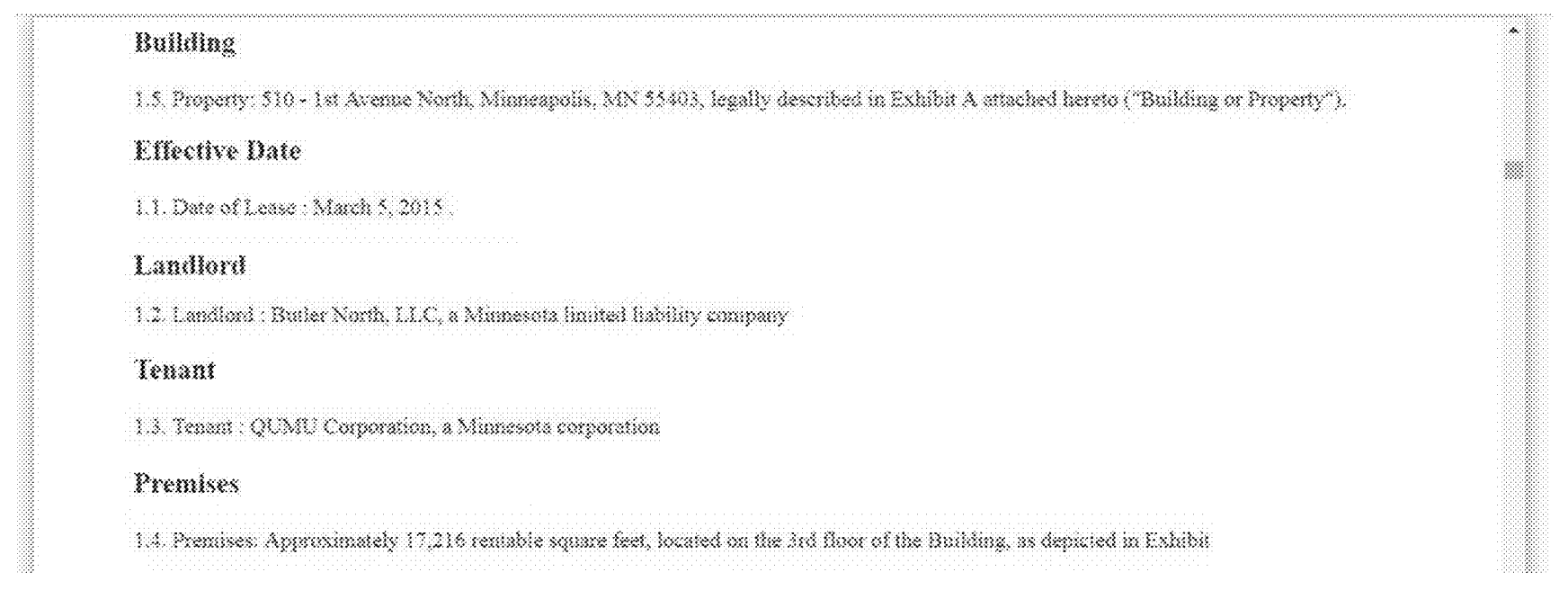

In another aspect, a tool is implemented to identify particular facts from a document that may be relevant to a reviewer ("named facts"). Examples include rent amount, tenant and landlord names, premises, building, commencement date, etc. The searching, analysis and extraction tools identified herein may be employed for this purpose. An example is shown in FIG. 20 of a user interface relaying various named facts from a document being reviewed.

The results of the comparison analyses may be rendered in a user interface to assist a user in receiving, interpreting and analyzing results. In one example, as an approximate user journey, the user may be enabled to pick a question in a task list. The relevant language in the review lease will then be displayed. When the user has clicked on a piece of language, they may want to see the comparable language in the standard lease. From there they may be enabled to opt to view any available deviation analysis functions (such as the many types described herein) to help them analyze the difference between the two provisions, such as a word difference or obligation analysis.

For example, upon clicking on language found in a review document that has been determined to be relevant to or a match to a particular question or topic, a user may be shown in a user interface:

1. All standard answers for the equivalent question. This may be configured to show a user all the standard answers available in chronological (reading) order. This is a safety net. It reduces the risk of the user missing something. Word diff will be available on all standard answers to every language hit in the review document (so if there are 5 hits and 3 standard answers, there will be 15 comparable matches shown); and/or
2. Any "highly comparable" standard answers. This may be configured to highlight to a user those standard answers that seem the most comparable to the particular hit in the review document that the user is reviewing at the time.

When the user clicks onto a next question or topic answer, they may be shown revised highlighting for option 2 above. For simple scenarios where there is only one language hit from the review document and a corresponding standard answer, then there may be no need for option 2 to be available to the user.

Word Diff

For each sentence in the review document that does have a counterpart in the standard, we compute word differences via the simple, well-established long string diff method, which identifies all changes in the text. To reduce visual overload we included an options for hiding minor types of changes, either involving addition/deleting of words from a user-provided list (e.g. "the", "a" and "an"), or small linguistic variations (e.g. "is" vs "are"). We call the underlying detection method Smart Word Diff.

Figure 13:
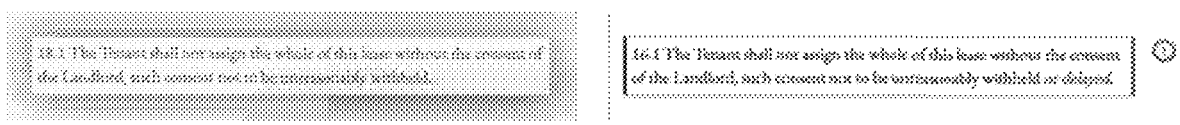
FIG. 13 shows an example of the output of an exemplary user interface.

The Word Diff module, based on the standard Python difflib module, serves as the baseline method to display relevant diffs of a pair-wise comparison to the user. FIG. 13 shows an example of the output of the algorithm in an exemplary user interface. The algorithm works by finding the longest common subsequence ("LCS") of two texts—this is the first "match" or "alignment" of the sentence. It then applies LCS again to the text before the first "match" and to the text after the first "match". This process may continue recursively after each match. Any text that is unmatched or unaligned becomes a diff.

This approach may be improved by 1.) switching sentence tokenization to use the spaCy implementation rather than nltk, 2.) using lemmatization, and 3.) ignoring section clause numbers. In another example, a linguistic resource like WordNet may be used in order to give the algorithm knowledge of synonym sets —therefore a change like "Premises"->"Property" or "Tenant ->"Resident" would be seamlessly treated as matched text, lessening the overall amount of text a user has to inspect.

In another exemplary approach, a smarter ranked diff is used which categorizes textual difference into relevancy categories. For example, "the", "an", "a" would be treated as irrelevant differences while "not", "but" and "and" (which are usually considered stopwords) are treated as relevant. We went about classifying diffs as relevant/not relevant in different ways. One was to used Machine Learning technique known as feature selection. This approach uses labeled data to find features which are most associated with a particular label. The specific approach we used was Mutual Information (See FIG. 3 for an example). Another way to classify diffs was to create expert lists of relevant and irrelevant words and aggregate the relevancy into a sentence-level score.

Multi-sentence Matching and Comparison

Figure 9:
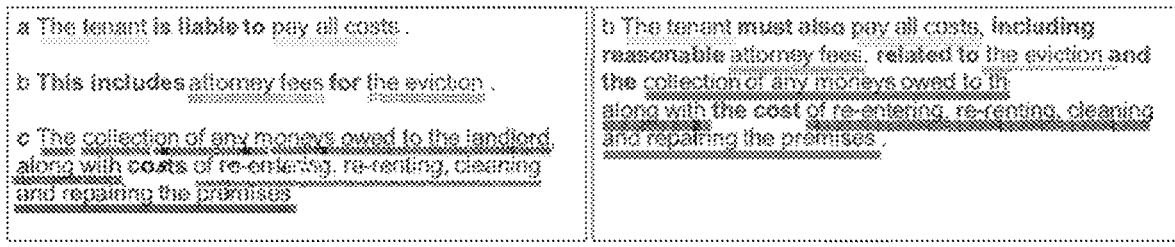
FIG. 9 presents an example of multiple sentences of a standard document being matched to one sentence of a review document.

A key part of the analysis is to map the similar sentences between the two documents and detect their deviations. This mapping could result in a sentence of the review document being mapped to multiple sentences of the standard document (many-to-one) and vice versa (one-to-many). FIG. 9 illustrates a many-to-one example. In this regard, FIG. 9 illustrates an example of multiple sentences of the standard document (on the left) being matched to one sentence of the review document (on the right). Red text indicates deviations between the two documents, while grayscale underlining indicates matching segments.

The goal of this analysis is to explore ways to align many-to-one matching sentences (meaning aligning their matching segments as illustrated by the grayscale underlining in FIG. 9) and perform deviation detection (display the words/segments that are different, red text in FIG. 9). The one-to-many alignment problem is effectively identical and only differs in how it should be displayed for the user.

Figure 10:
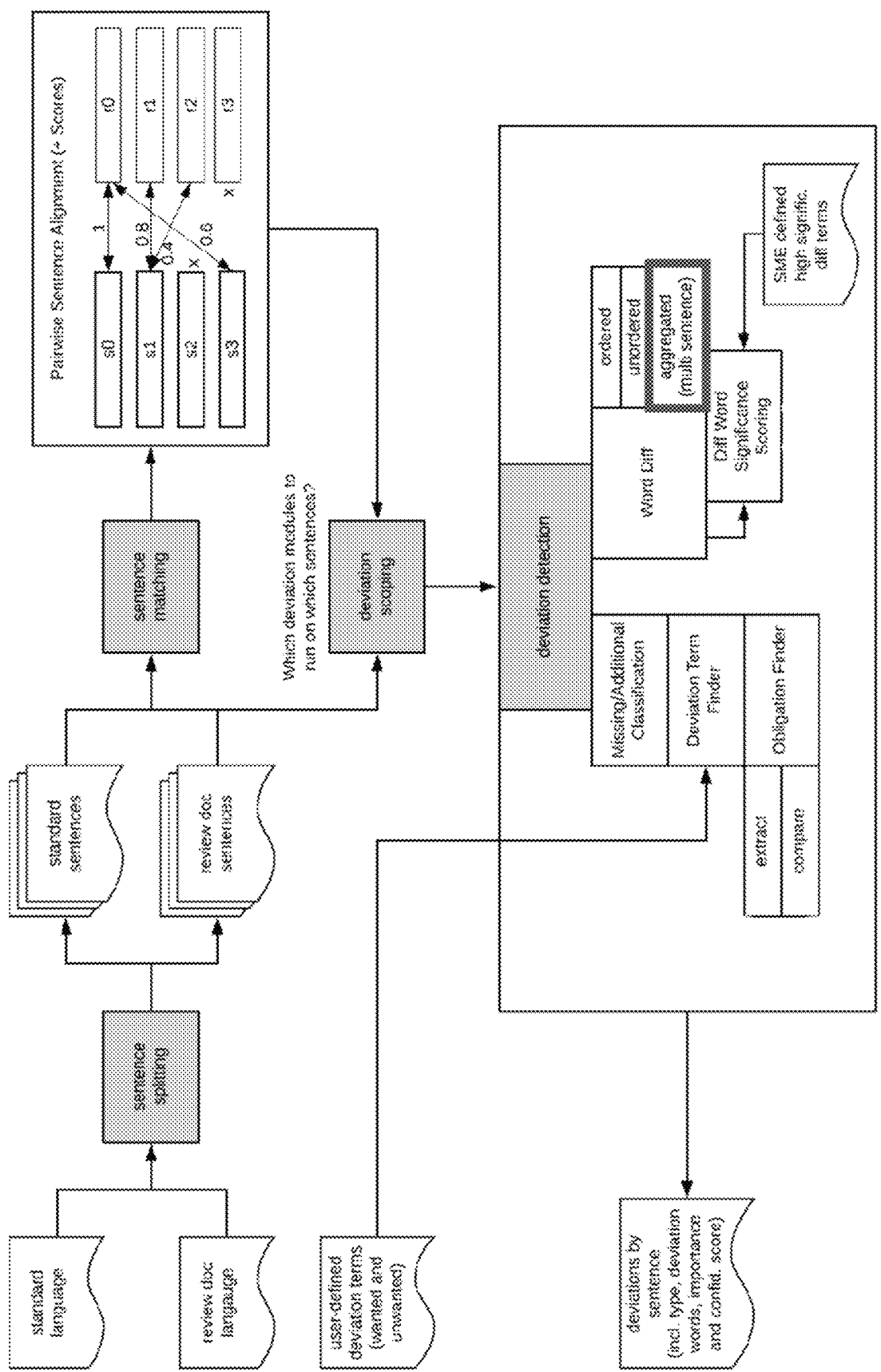
FIG. 10 depicts a flow chart of document comparison steps according to an exemplary embodiment of the present innovations.

FIG. 10 shows how the multi-sentence deviation detection (MSDD) module may be positioned in an analysis pipeline.

The input to the MSDD module is a target sentence from the standard document and a list of matched sentences from the review document, while the decision about the matching has been performed upstream (by the sentence matching and deviation scoping modules).

The output of the MSDD module is the identified deviations in the form of the indices of non-aligned tokens for each sentence in the comparison, both from the standard and the review documents (the red text in FIG. 9).

As shown in FIG. 10, the MSDD module uses the deviation detection techniques available in the pipeline. Additional ways of deviation detection have also been explored and will be described below.

The following matching depicted in Table 15 will be used hereafter to demonstrate the performance of the different methods used for the multi-sentence deviation detection module.

TABLE 15

| Standard Document | Review Document |
|---|---|
| 3.2.1 Immediately after the end of the term (and notwithstanding that the term has ended), the Tenant shall make an application to remove all entries on the Landlord's title relating to the easements granted by this lease and shall ensure that any requisitions raised by HM Land Registry in connection with that application are dealt with promptly and properly. 3.2.2 The Tenant shall keep the Landlord informed of the progress and completion of its application. 3.3 The Tenant shall adhere to all laws relating to the Rights and all reasonable regulations in connection with the exercise of the Rights that the Landlord may make from time to time and notify to the Tenant in writing. | 2.3 The Tenant shall comply with all laws relating to the Rights and all reasonable regulations in connection with the exercise of the Rights that the Landlord may make from time to time and notify to the Tenant in writing, and immediately after the end of the term, the Tenant shall make an application to remove all entries on the Landlord's title relating to the easements granted by this lease and shall ensure that any requisitions raised by HM Land Registry in connection with that application are dealt with promptly and properly and the Tenant shall keep the Landlord informed of the progress and completion of its application. |

The MDSS was tested using gold data, meaning sentences that have been already matched from the expert and were therefore indeed matching sentences.

In one example, shown in Table 16, MDSS uses difflib and concatenated sentences. From the difflib package documentation: "the basic algorithm predates, and is a little fancier than, an algorithm published in the late 1980's by Ratcliff and Obershelp under the hyperbolic name "gestalt pattern matching." The idea is to find the longest contiguous matching subsequence that contains no "junk" elements (the Ratcliff and Obershelp algorithm doesn't address junk). The same idea is then applied recursively to the pieces of the sequences to the left and to the right of the matching subsequence. This does not yield minimal edit sequences, but does tend to yield matches that "look right" to people."

TABLE 16

MDSS using difflib and concatenated sentences. Deviations highlighted in underline.

| Standard Document | Review Document |
|---|---|
| 3.2.1 Immediately after the end of the term (and notwithstanding that the term has ended), the Tenant shall make an application to remove all entries on the Landlord's title relating to the easements granted by this lease and shall ensure that any requisitions raised by HM Land | 2.3 The Tenant shall comply with all laws relating to the Rights and all reasonable regulations in connection with the exercise of the Rights that the Landlord may make from time to time and notify to the Tenant in writing, and immediately after the end of the term, the Tenant shall make an |

TABLE 16-continued

MDSS using difflib and concatenated sentences. Deviations highlighted in underline.

| Standard Document | Review Document |
|---|---|
| Registry in connection with that application are dealt with promptly and properly.<br>3.2.2 The Tenant shall keep the Landlord informed of the progress and completion of its application.<br>3.3 The Tenant shall adhere to all laws <u>relating to the Rights and all reasonable regulations in connection with the exercise of the Rights that the Landlord may make from time to time and notify to the Tenant in writing.</u> | application to remove all entries on the Landlord's title relating to the easements granted by this lease and shall ensure that any requisitions raised by HM Land Registry in connection with that application are dealt with promptly and properly <u>and</u> the Tenant shall keep the Landlord informed of the progress and completion of its application. |

Firstly, the SequenceMatcher class of the difflib package has been applied to the comparison of the one sentence of the review document against a single sentence that was the result of concatenation of the many review sentences.

In another example, shown in Table 17, MDSS uses difflib and independent sentence comparison.

TABLE 17

MDSS using difflib and independent sentence comparison results. Deviations highlighted in underline.

| Standard Document | Review Document |
|---|---|
| 3.2.1 Immediately after the end of the term <u>(and notwithstanding that the term has ended),</u> the Tenant shall make an application to remove all entries on the Landlord's title relating to the easements granted by this lease and shall ensure that any requisitions raised by HM Land Registry in connection with that application are dealt with promptly and properly.<br>3.2.2 The Tenant shall keep the Landlord informed of the progress and completion of its application.<br>3.3 The Tenant shall <u>adhere</u> to all laws relating to the Rights and all reasonable regulations in connection with the exercise of the Rights that the Landlord may make from time to time and notify to the Tenant in writing. | 2.3 The Tenant shall <u>comply with</u> all laws relating to the Rights and all reasonable regulations in connection with the exercise of the Rights that the Landlord may make from time to time and notify to the Tenant in writing, <u>and immediately</u> after the end of the term, the Tenant shall make an application to remove all entries on the Landlord's title relating to the easements granted by this lease and shall ensure that any requisitions raised by HM Land Registry in connection with that application are dealt with promptly and properly <u>and</u> the Tenant shall keep the Landlord informed of the progress and completion of its application. |

Comparing independently each sentence of the standard document to the sentence of the review document yields better results as the approach is not sensitive to the sentence order of appearance. Another benefit of using the difflib approach in general is the fact that the SequenceMatcher provides an indication of the 1-1 matched sentence segments as indicated for example by the grayscale underlining in FIG. 9. This is a useful aid to identify how was the optimal alignment performed and potentially for visualization purposes in the GUI.

In another example, a symmetric difference of feature sets from a pretrained count vectorizer may be employed. For this approach, a pretrained count vectorizer was used to extract features (tokens and bigrams) from the compared sentences. The count vectorizer is part of the sklearn library and it was created using three sample leases. The extracted features from the standard document sentences were considered a common set and compared to the set of features of the sentence of the review document. Tokens belonging in the difference of the two sets were then marked in underline (Table 18). This approach has the benefit of being less visually overwhelming especially for common words that are less likely to change the meaning of the sentences such as stop words.

TABLE 18

Symmetric difference of sets of sentence(s) tokens.

| Standard Document | Review Document |
|---|---|
| 3.2.1 Immediately after the end of the term (and <u>notwithstanding</u> that the term <u>has</u> ended), the Tenant shall make an application to remove all entries on the Landlord's title relating to the easements granted by this lease and shall ensure that | 2.3 The Tenant shall <u>comply</u> with all laws relating to the Rights and all reasonable regulations in connection with the exercise of the Rights that the Landlord may make from time to time and notify to the Tenant in writing, and immediately after the end of |

TABLE 18-continued

Symmetric difference of sets of sentence(s) tokens.

| Standard Document | Review Document |
|---|---|
| any requisitions raised by HM Land Registry in connection with that application are dealt with promptly and properly. 3.2.2 The Tenant shall keep the Landlord informed of the progress and completion of its application. 3.3 The Tenant shall adhere to all laws relating to the Rights and all reasonable regulations in connection with the exercise of the Rights that the Landlord may make from time to time and notify to the Tenant in writing. | the term, the Tenant shall make an application to remove all entries on the Landlord's title relating to the easements granted by this lease and shall ensure that any requisitions raised by HM Land Registry in connection with that application are dealt with promptly and properly and the Tenant shall keep the Landlord informed of the progress and completion of its application. |

Multi-sentence deviation detection may be improved by various means. For example, data pre-processing may be accomplished by normalizing input data by lowercasing, removing clause list items in the beginning of the sentences (i.e. a), b), iii), 12.1 etc), removing numbers and punctuation. This function may be moved upstream of the matching task.

In another example, a custom stop word list may be used, derived from a default stop word list included in the NLTK python package but excluding all negation-related terms. This may be implemented in the "Smart Diff" module discussed herein.

In another example, stemming and lemmatization are employed. In yet another example, synonyms may be identified and used in the analysis.

As an exemplary alternative to difflib, the Fuzzy Match algorithm may be used. While difflib aligns sentence segments only when they are identical, the goal of the Fuzzy Match is to align the matching sentence segments based on a similarity score. The Fuzzy Match algorithm performs the alignment using dynamic programming inspired by the Longest Common Subsequence (LCS) algorithm with the difference that the similarity between two tokens now corresponds to the cosine similarity of the token vectors obtained by Spacy (see section Synonyms and Semantics using Spacy language model). For two sentences of m and n number of tokens respectively, we calculate the score at each position of the matrix M as following, where skip_penalty is a small penalty for mismatches outside a diagonal and unmatched_threshold is a parameter that allows only high similarity scores to contribute to the alignment path.

Figure 11:
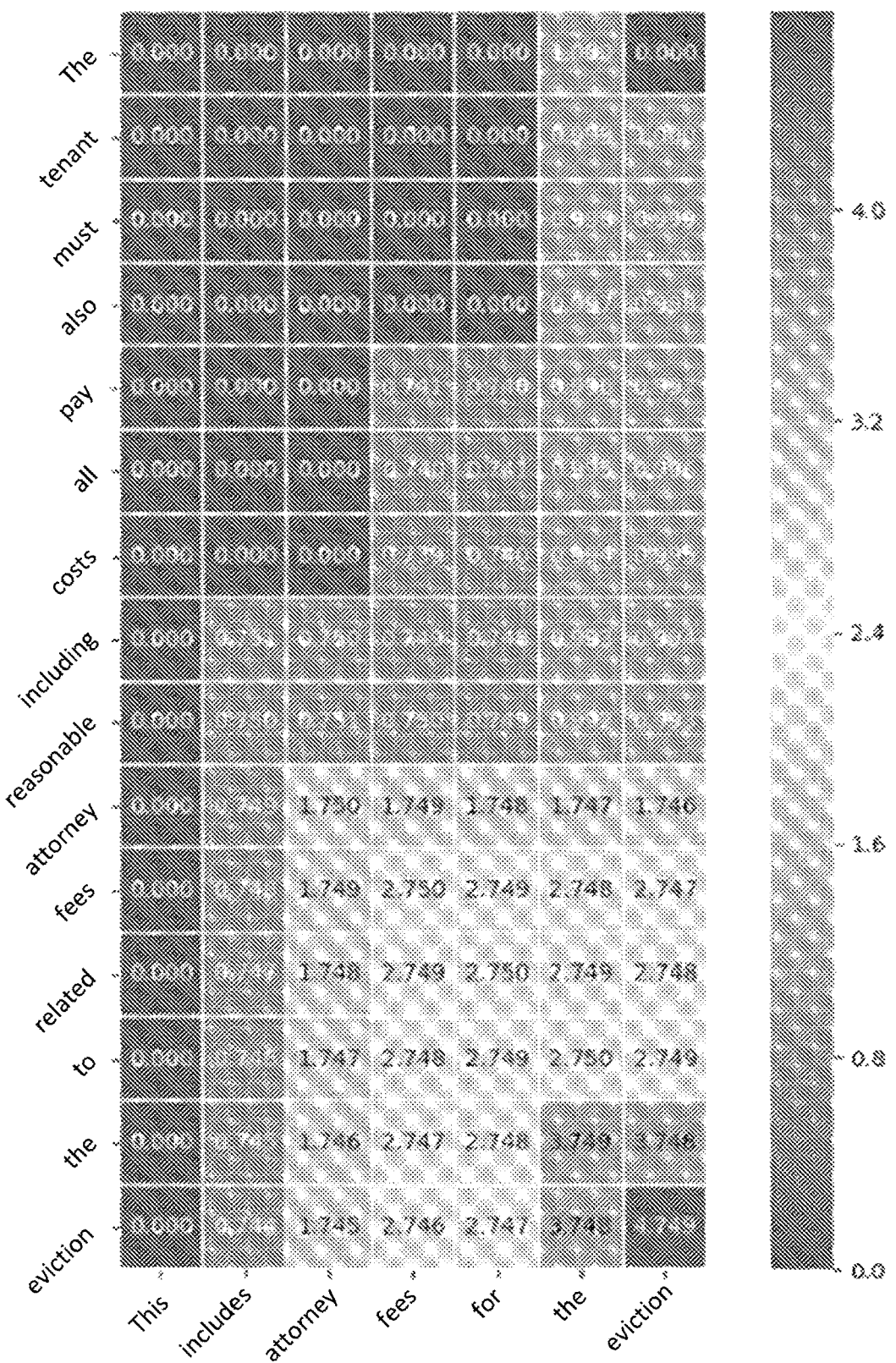
FIG. 11 shows a heatmap representation of a matrix for the alignment of two exemplary sentences.

FIG. 11 shows a heatmap representation of matrix M for the alignment of the sentences "The tenant must also pay all costs, including reasonable attorney fees, related to the eviction." and "This includes attorney fees for the eviction." Higher scores are represented in the blue color range while lower similarities scores are in the red color range. As progressively the alignment improves by encountering similar words, the overall score of the alignment also increases as indicated by the value and the color of the respective cell.

Figure 12:
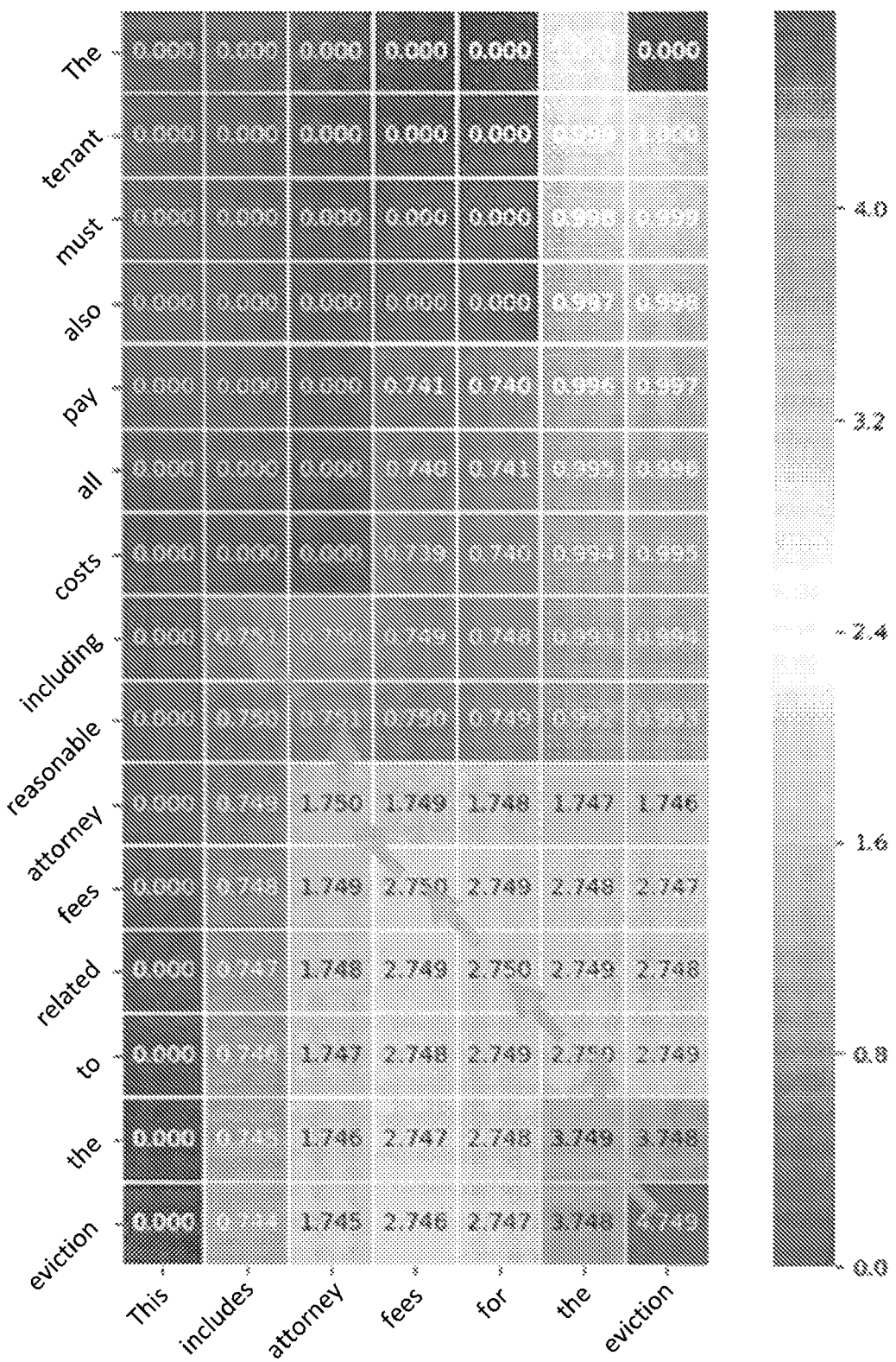
FIG. 12 shows an example of retracing the best segment alignment of exemplary sentences.

After constructing matrix M, we can retrace the best segment alignment by starting at cell M[m,n], the last cell of the table, and follow the scoring path that leads to that cell by adding tokens whenever we are moving on the diagonal as long as the move has led to an increased score (FIG. 12). For the example shown in FIGS. 11 and 12, the matched segments tokens are {includes, attorney, fees, the, eviction} and {including, attorney, fees, the, eviction}.

Obligation Change/Deviation Detection

To further reduce visual overload, and categorize changes in a meaningful way, we introduced the concept of Obligation Change Detection. The obligation change detection module provides a novel mechanism for linguistic comparison at the conceptual (rather than pure syntactic) level. Given a standard and a review sentence, we first identify key linguistic building blocks like actor, main obligation, and any restrictions or conditions. Second, we categorize differences with respect to these building blocks (e.g. additional/missing obligation), allowing us to flag types of changes in a meaningful way, as shown in the examples depicted in FIG. 3.

Figure 23:
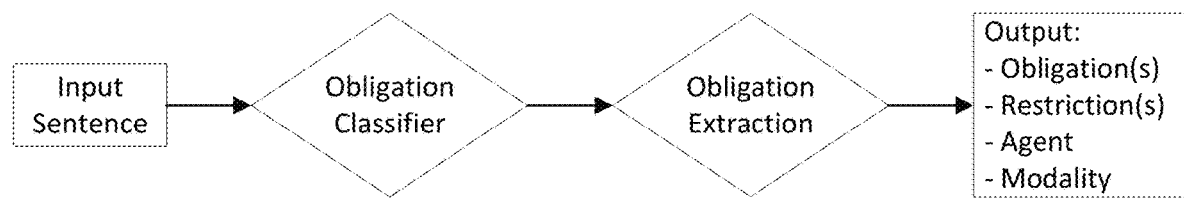
FIG. 23 is a flow chart showing an exemplary approach to obligation classification and extraction according to an exemplary embodiment.

As shown in FIG. 23, a first step of an obligation analysis is to determine whether a given sentence contains an obligation and, if so, to extract its various components.

In one example, this requires obtaining a dependency parse of the input text. Dependency parsing aims to represent the grammatical structure of a sentence as a set of one-to-one relationships between words.

Figure 24:
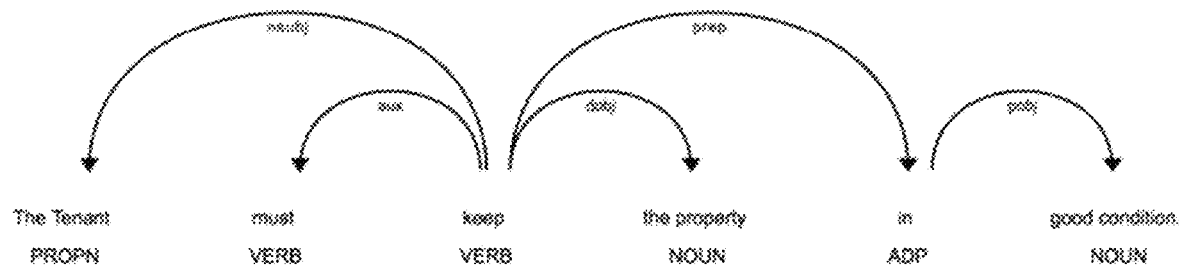
FIG. 24 shows a dependency parse structure of an exemplary sentence.

FIG. 24 shows a dependency parse structure of the sentence: "The Tenant must keep the property in good condition". This is a simplified representation as noun chunks (e.g. "The Tenant") have been grouped together. In this example, the verb "keep" is the root of the tree, and all other phrases are either directly or indirectly connected to it via relationships called dependencies.

In one implementation, rules-based logic underlying obligation extraction works as follows. First, the dependency parse of the input sentence is obtained.

Then, the sentence type may be classified (e.g., infinitive, modal or none). For example, the sentence may be checked for acceptable modal keywords. A modal keyword is a "can", "must", "shall", "will" or "may" that is the auxiliary of a verb that has a nominal subject such as "the Landlord" or "the Tenant". As another example, the sentence may be checked for the presence of an infinitive verb token. An infinitive verb token is tagged as a verb and is preceded by the (non-passive) auxiliary "to".

Then, obligations may be extracted. For example, a sentence may be checked for the presence of an agent if one exists. For example, if the sentence is modal, a tool may be configured to check if there is a token that is the nominal subject of the first modal or verb token (extracted previously) with a subtree that contains an actor keyword such as "landlord" or "tenant." As another example, if the sentence is infinitive, a tool may be configured to check tokens preceding the main verb (extracted previously) for a match with any of the actor keywords.

Obligation text spans may be extracted. For example, if the sentence is modal, for each modal/verb token pair, a span may be identified starting from each modal token and ending with the rightmost child of the verb token. As another example, if the sentence is infinitive, and if there is only one obligation in the sentence, the entire sentence may be identified as the obligation span. Otherwise, if there are multiple obligations connected by the conjunction "and," the sentence may be split around the conjunction.

Then, the modality of each obligation may be extracted based on, for example, the modal verb and whether it is preceded by the word "not."

Then, restriction spans may be extracted by searching the sentence for restriction trigger words (e.g., "except", "subject to", "without the consent", "provided that", "if", "unless").

Figure 25:
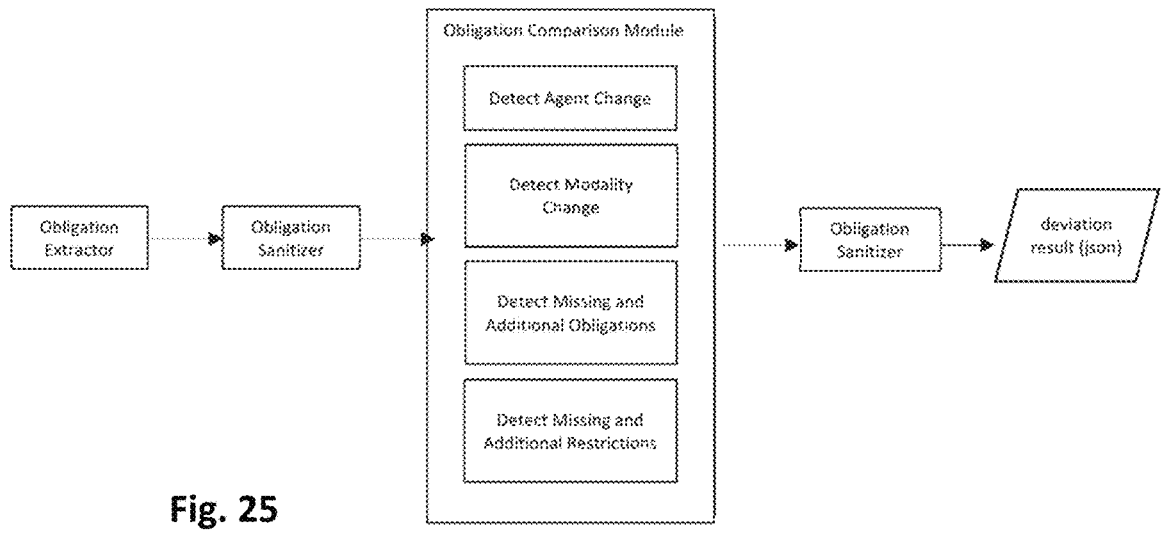
FIG. 25 is a flow chart showing an exemplary approach to obligation comparison and change and deviation detection according to an exemplary embodiment.

Once extracted, obligations may be sanitized and compared to one another for changes or deviations, as shown in FIG. 25. Obligations may differ from one another in a number of different semantic and logical ways. FIG. 3 (described above) provides exemplary depictions of obligation comparisons. More examples are shown in Table 19.

TABLE 19

| Change/Deviation Type | Indication |
| --- | --- |
| Change in agent | if the actor of the obligation has changed |
| Missing obligation | an obligation is present in the standard lease sentence but not in the review lease sentence |
| Additional obligation | an obligation is present in the review lease sentence but not in the standard lease sentence |
| Missing restriction | a restriction is present in the standard lease sentence but not in the review lease sentence |
| Additional restriction | a restriction is present in the review lease sentence but not in the standard lease sentence |
| Modality change | Modality refers to an obligation category produced by the Obligation Extractor. The possible classes/categories of modality may be, for example: Permission: Tenant may assign the whole of the Premises. Forbiddance: Tenant may not assign the whole of the Premises. Obligation: Tenant must keep the Premises clean and tidy. No Obligation: Tenant is not liable for repairs. |

To detect these changes and deviations, different analyses may be deployed. For example, as shown in FIG. 25, an agent change may be detected, a modality change may be detected, missing and additional obligations may be detected, and missing and additional restrictions may be detected.

A comparison module may be responsible for calling an obligation extractor on a pair of input sentences and then running the methods below to obtain deviation results. The module also may be configured to determine the spans that need to be highlighted in the user interface and prepare a dictionary as an output which can be easily serialized to JSON and passed back to the calling deviation service layer.

Agent change detection may be accomplished in one or more steps. For example, a preprocessing step and a fuzzy string matching step may be employed. In the first step, we apply a rule to resolve anaphora such as "Both parties" to a more common string such as "The Tenant and the Landlord". In the second step we use the SequenceMatcher ratio( ) method to detect similar agents (2*M/T) where M is number of "matches" found by SM and T is number of elements in two strings. Similarity metrics provided by fuzzywuzzy library (calculate similarity of two strings based on the Levenshtein edit distance) may also be employed.

An extracted obligation (like an extracted restriction) is generally a substring of the entire sentence from which it was extracted. In order to detect additional or missing obligations, one exemplary approach is to transform each obligation to tf-idf vectors and reuse a sentence matching module. In this step, for each standard obligation, we select the single best obligation match from the review side; each "match" is determined using a threshold that is set by hand. Any obligation on the standard side that is unmatched is considered a missing obligation. Any unmatched obligation on the review side is an additional obligation.

Analysis of restrictions may be configured to use the same exact mechanism as missing/additional obligation detection, with an additional step to double-check any unmatched restrictions (these are potential deviations). For each unmatched restriction, we use fuzzy substring search implemented with SequenceMatcher class ratio( )method (similar to agent change detection). If the method determines the restriction is a substring of the opposite side, we remove it from the list of deviations to avoid confusing/incorrect output.

Modality change detection may be configured as an equality check of the extractor's modality category of matched obligations. The module may then determine the character spans to be highlighted as this deviation type requires highlighting on both standard and review side.

Figure 26:
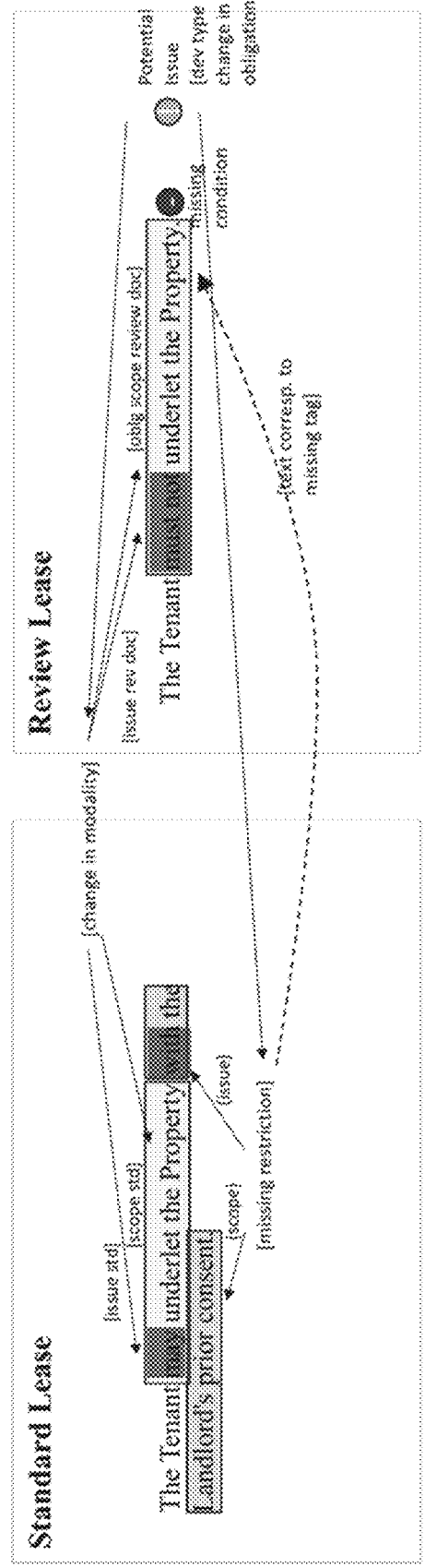
FIG. 26 shows an example of a standard lease term compared against a review lease with multiple changes detected according to an exemplary embodiment.

Of course, multiple different types of obligation changes or deviations may be detected and signaled to a user via a user interface. For example, FIG. 26 shows an example of a standard lease term compared against a review lease with multiple changes detected.

While categorizing changes in the above described manner helps with prioritization and triage of review, it does not necessarily give a definite indication of the risk or impact of the change, as this would not only require full semantic text comparison but also an indication of what the specific client cares about for the review. We leave this interpretation step to the expert user.

The systems and methods described herein may be embodied in a standalone system, a system accessible by other systems or any combination. For example, in a standalone system embodiment, the tools for detecting deviations among documents and portions thereof, extracting information from documents and portions thereof, and detecting deviations between obligations in documents and portions thereof may be comprised in a standalone application residing on a user's computing device or accessed vie a network or internet link from the user's device. Such a standalone application may be configured to obtain standard documents such as standard playbooks or standard contracts from a contract analytics tool or other library through a web, network and/or API link, for example. Such an application may be configured to create user dashboards, visualizations and detection result exports. Such an application may be configured to interact with another application configured to perform any of the steps described herein.

The systems and methods described herein may also be embodied in a service accessible to other applications via a web, network or API link. For example, a contract evaluation tool may be configured to access a service that provides tools for detecting deviations among documents and portions thereof, extracting information from documents and portions thereof, and detecting deviations between obligations in documents and portions thereof independently via an API.

FIGS. 1 through 26 are conceptual illustrations allowing for an explanation of the present disclosure. It should be understood that various aspects of the embodiments of the present disclosure could be implemented in hardware, firmware, software, or combinations thereof. In such embodiments, the various components and/or steps would be implemented in hardware, firmware, and/or software to perform the functions of the present disclosure. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the disclosure as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present disclosure to a single embodiment, as other embodiments are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an embodiment showing a singular component should not necessarily be limited to other embodiments including a plurality of the same component, and vice-versa, unless explicitly stated otherwise herein. Moreover, the applicant does not intend for any term in the specification or claims to be ascribed an uncommon or special meaning unless explicitly set forth as such. Further, the present disclosure encompasses present and future known equivalents to the known components referred to herein by way of illustration.

The foregoing description of the specific embodiments so fully reveals the general nature of the disclosure that others can, by applying knowledge within the skill of the relevant art(s), readily modify and/or adapt for various applications such specific embodiments, without undue experimentation, without departing from the general concept of the present disclosure. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

In order to address various issues and advance the art, the entirety of this application for SYSTEMS AND METHODS FOR DEVIATION DETECTION, INFORMATION EXTRACTION AND OBLIGATION DEVIATION DETECTION (including the Cover Page, Title, Abstract, Headings, Cross-Reference to Related Application, Background, Brief Summary, Brief Description of the Drawings, Detailed Description, Claims, Figures, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of an individual and/or enterprise user, database configuration and/or relational model, data type, data transmission and/or network framework, syntax structure, and/or the like, various embodiments may be implemented that enable a great deal of flexibility and customization. While various embodiments and discussions have included reference to applications in the legal context, and more specifically in the context of contract review, it is to be understood that the embodiments described herein may be readily configured and/or customized for a wide variety of other applications and/or implementations.

What is claimed is:

1. A method for detecting deviations in obligations, comprising:
   based on a pairwise sentence alignment between a standard sentence in a standard document and a review sentence in a review document, converting the standard sentence and review sentence into respective feature sets for a classifier model;
   generating a predicted similarity between the standard sentence and review sentence associated with the pairwise sentence alignment by applying the classifier model to the respective feature sets for the standard sentence and review sentence;
   in response to the predicted similarity between the standard sentence and the review sentence being above a defined similarity threshold, identifying any differences between actors, obligations and restrictions of the standard sentence and review sentence; and
   in response to identifying the differences between the actors, obligations and restrictions of the standard sentence and review sentence, causing display of visual data associated with the differences via a user interface of a user computing device.

2. The method of claim 1, wherein obligations are identified by at least selecting and applying an obligation detection tool from among a plurality of obligation detection tools based on a classification of the sentence to which the tool is to be applied.

3. The method of claim 1, further comprising identifying a modality of each obligation identified and identifying any difference between obligation modalities of the standard sentence and the review sentence.

4. The method of claim 1, further comprising if multiple obligations are identified in a sentence, splitting the sentence into sentence portions such that each sentence portion includes at most one obligation.

5. The method of claim 1, wherein restrictions are identified by at least identifying the presence in a sentence of any of a predetermined plurality of restriction trigger words.

6. The method of claim 1, further comprising highlighting an identified obligation in the user interface.

7. The method of claim 1, further comprising compiling identified obligations into a dictionary and passing the dictionary back to a requestor of the obligation deviation detection.

8. The method of claim 1, further comprising preprocessing the standard sentence and review sentence by replacing any agents referenced as anaphora with a different text string to which the anaphora refers.

9. The method of claim 1, wherein identifying differences between agents includes calculating a non-binary similarity metric between agents identified in the standard sentence and in the review sentence.

10. The method of claim 1, wherein multiple review sentences are received, obligations are identified in the multiple review sentences, and the method further comprises identifying a particular obligation identified in the multiple review sentences that satisfies similarity criterion with respect to an obligation identified in the standard sentence.

11. The method of claim 10, wherein if an obligation is not identified in the multiple review sentences for which a similarity to the obligation identified in the standard sentence is above a predetermined threshold, an indication is displayed on the user interface that the obligation identified in the standard sentence has been deleted from the multiple review sentences.

12. The method of claim 1, wherein multiple standard sentences are received, obligations are identified in the multiple standard sentences, and the method further comprises:
   identifying a particular obligation identified in the multiple standard sentences that satisfies similarity criterion with respect to an obligation identified in the review sentence and
   if an obligation is not identified in the multiple standard sentences for which a similarity to the obligation identified in the review sentence is above a predetermined threshold, an indication is displayed on the user interface that the obligation identified in the review sentence has been added to the multiple standard sentences.

13. The method of claim 1, wherein identifying differences between restrictions includes calculating a non-binary similarity metric between restrictions identified in the standard sentence and in the review sentence.

* * * * *